US012011107B2

(12) United States Patent
Korovilas et al.

(10) Patent No.: US 12,011,107 B2
(45) Date of Patent: Jun. 18, 2024

(54) BEVERAGE HOLDER

(71) Applicants: Stavros Korovilas, Skokie, IL (US); Sarah C. Severson, Schaumburg, IL (US); James David Shaw, Chicago, IL (US); Corey Alan Davis, Chicago, IL (US)

(72) Inventors: Stavros Korovilas, Skokie, IL (US); Sarah C. Severson, Schaumburg, IL (US); James David Shaw, Chicago, IL (US); Corey Alan Davis, Chicago, IL (US)

(73) Assignee: BEVZI LLC, Skokie, IL (US)

( * ) Notice: Subject to any disclaimer, the term of this patent is extended or adjusted under 35 U.S.C. 154(b) by 0 days.

(21) Appl. No.: 17/871,450

(22) Filed: Jul. 22, 2022

(65) Prior Publication Data

US 2024/0023742 A1 Jan. 25, 2024

(51) Int. Cl.
*A47G 23/02* (2006.01)
*A61J 9/06* (2006.01)
(Continued)

(52) U.S. Cl.
CPC ..... *A47G 23/0216* (2013.01); *A47G 23/0241* (2013.01); *A47G 23/0266* (2013.01); *A61J 9/0684* (2015.05); *B65D 81/3876* (2013.01); *B65D 81/3881* (2013.01); *B65D 81/3886* (2013.01); *A47G 2400/08* (2013.01); *B60N 3/10* (2013.01)

(58) Field of Classification Search
CPC ............ A47G 23/0216; A47G 23/0241; A47G 23/0266; A47G 2400/08; A47G 81/3876; A47G 81/3881; A47G 81/3886; A61J 9/0684; B01N 3/10
See application file for complete search history.

(56) References Cited

U.S. PATENT DOCUMENTS 3,028,702 A * 4/1962 St Cyr ............... A47G 23/0216
   220/630
4,299,100 A * 11/1981 Crisman ............ B65D 81/3883
   220/592.17
(Continued)

OTHER PUBLICATIONS

International Search Report and Written Opinion dated Nov. 28, 2023 for PCT/US2023/028212.

*Primary Examiner* — Nathan J Jenness
*Assistant Examiner* — Jennifer Castriotta
(74) *Attorney, Agent, or Firm* — Foley & Lardner LLP

(57) ABSTRACT

A beverage holder includes a frame, an insert, and a cover. The frame includes a sidewall having an upper end and a lower end, and a bottom wall extending across the lower end. The upper end defines a plurality of protrusions. The sidewall and the bottom wall cooperatively define a chamber. The insert includes a peripheral rim defining a plurality of apertures that receive the plurality of protrusions and a flexible collar extending from the peripheral rim and at least partially into the chamber. The flexible collar defines an opening leading to the chamber. The cover includes a plurality of interfaces that engage with the plurality of protrusions to couple the cover to the upper end of the sidewall and to secure the insert between the frame and the cover. The cover defines an aperture that aligns with the chamber and the opening.

20 Claims, 31 Drawing Sheets

(51) Int. Cl.
    *B65D 81/38*     (2006.01)
    *B60N 3/10*     (2006.01)

(56) References Cited

U.S. PATENT DOCUMENTS

| | | | | |
|---|---|---|---|---|
| 4,889,302 | A * | 12/1989 | Tucker | F25D 31/007 |
| | | | | 220/592.01 |
| 4,971,276 | A * | 11/1990 | Tannenbaum | A47G 23/0241 |
| | | | | 248/316.1 |
| 5,071,096 | A * | 12/1991 | Hartman | A47G 23/0216 |
| | | | | 248/154 |
| 5,143,338 | A * | 9/1992 | Eberlin | B60N 3/101 |
| | | | | 248/315 |
| 5,310,072 | A * | 5/1994 | Matusovsky | A47G 19/06 |
| | | | | 220/737 |
| 5,361,604 | A * | 11/1994 | Pier | F25D 31/007 |
| | | | | 62/530 |
| 7,568,362 | B2 * | 8/2009 | Oas | A47G 23/0216 |
| | | | | 62/457.3 |
| D704,512 | S | 5/2014 | Kellow, Jr. | |
| 8,757,426 | B1 | 6/2014 | Serrano | |
| D742,698 | S | 11/2015 | Kellow, Jr. | |
| 9,265,370 | B2 | 2/2016 | Kellow, Jr. | |
| D750,939 | S | 3/2016 | Kellow, Jr. | |
| D777,529 | S | 1/2017 | Kellow, Jr. | |
| D781,659 | S | 3/2017 | Kellow, Jr. | |
| 10,596,947 | B2 * | 3/2020 | Smithson | B60N 3/105 |
| 11,071,401 | B1 * | 7/2021 | Krueger | A47G 23/0316 |
| 11,213,150 | B2 * | 1/2022 | Felty | A47G 23/0216 |
| 11,597,582 | B1 * | 3/2023 | French | F25D 3/08 |
| 2006/0175506 | A1 | 8/2006 | Lan | |
| 2014/0263913 | A1 | 9/2014 | Korovilas | |
| 2020/0253406 | A1 | 8/2020 | Mills | |

* cited by examiner

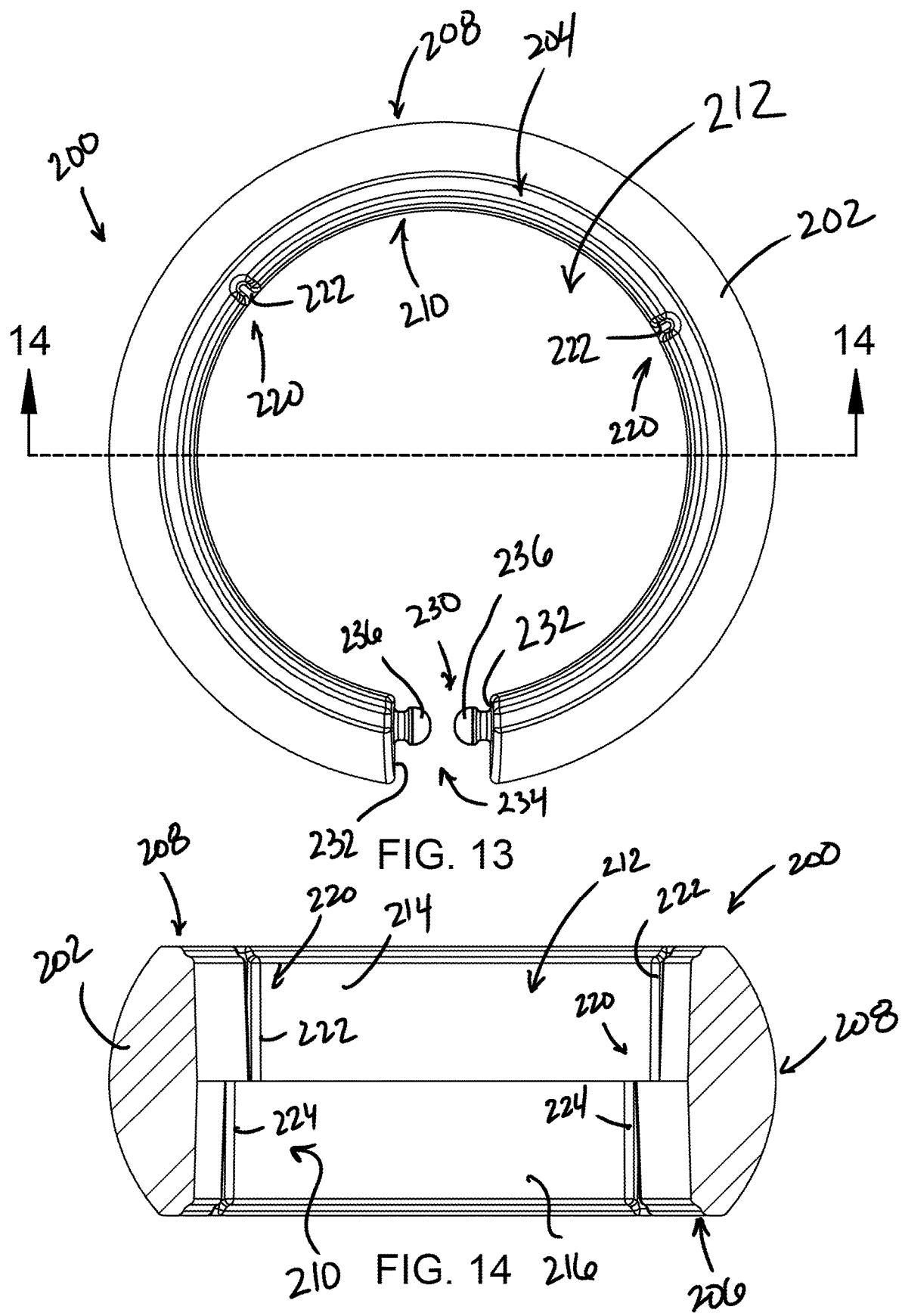

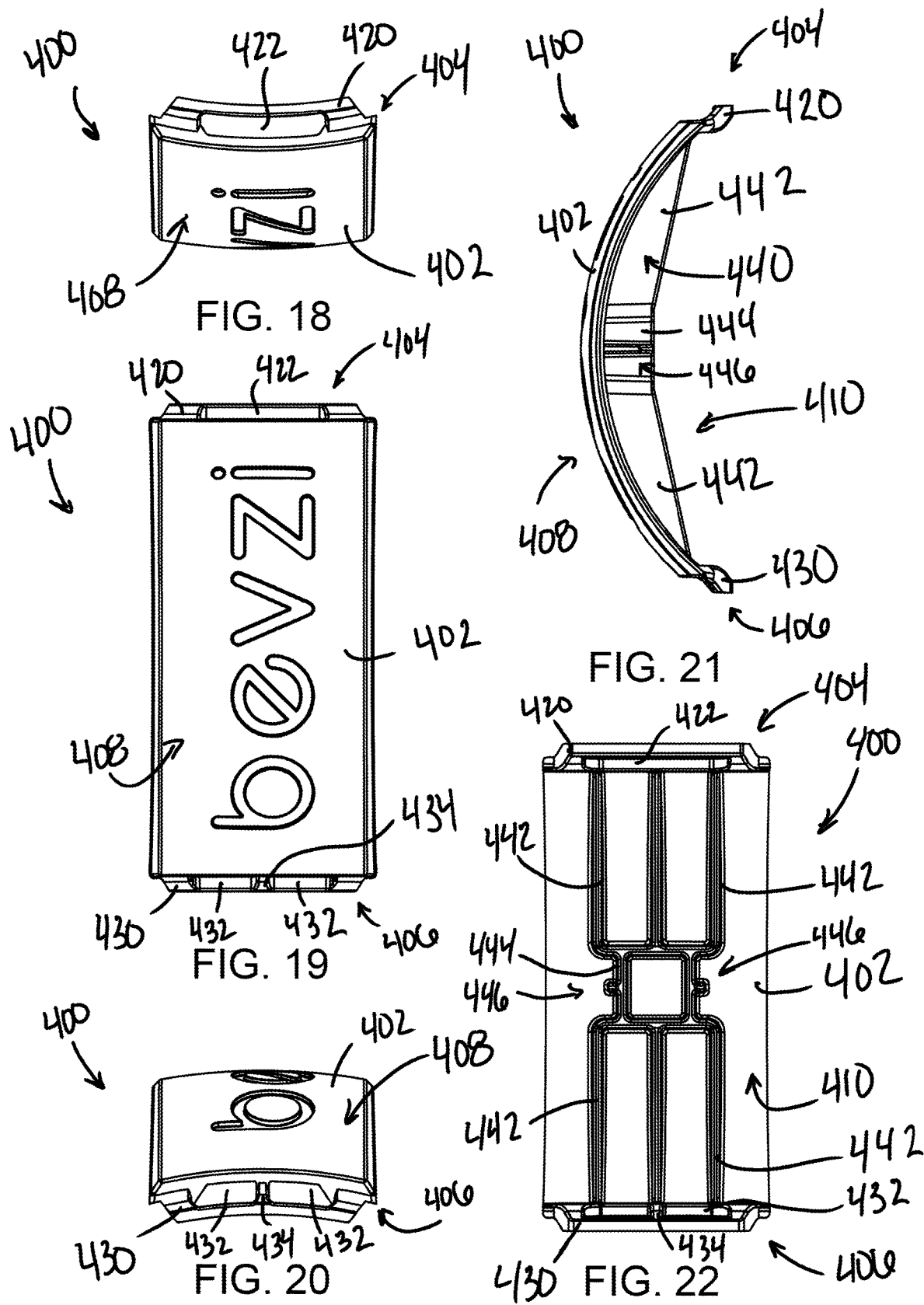

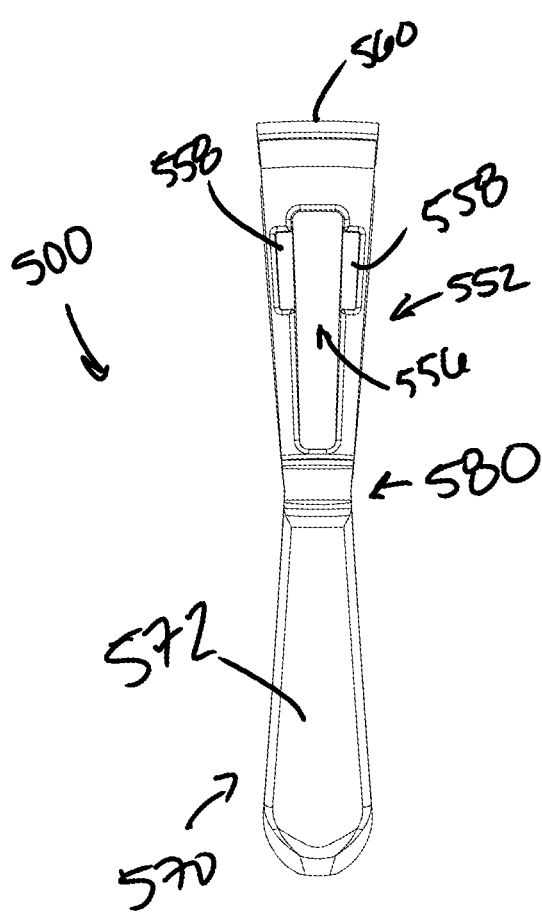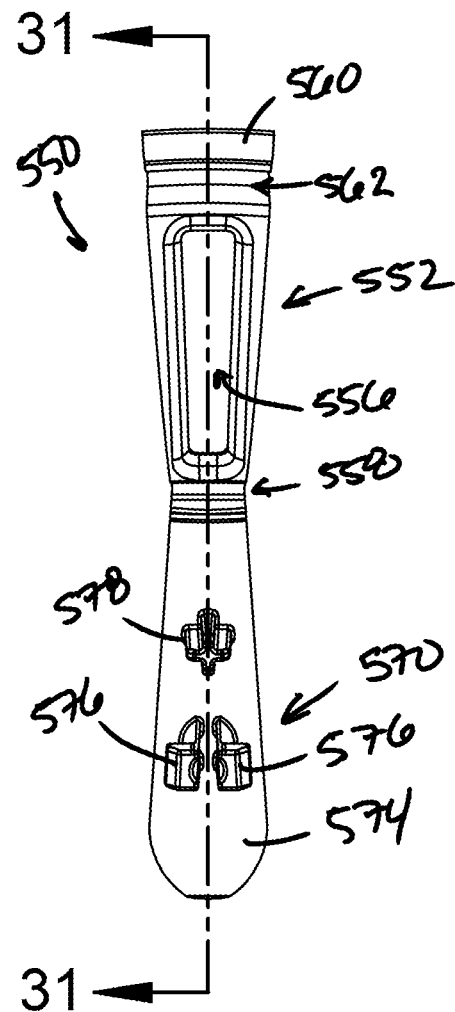
FIG. 29　　　FIG. 30
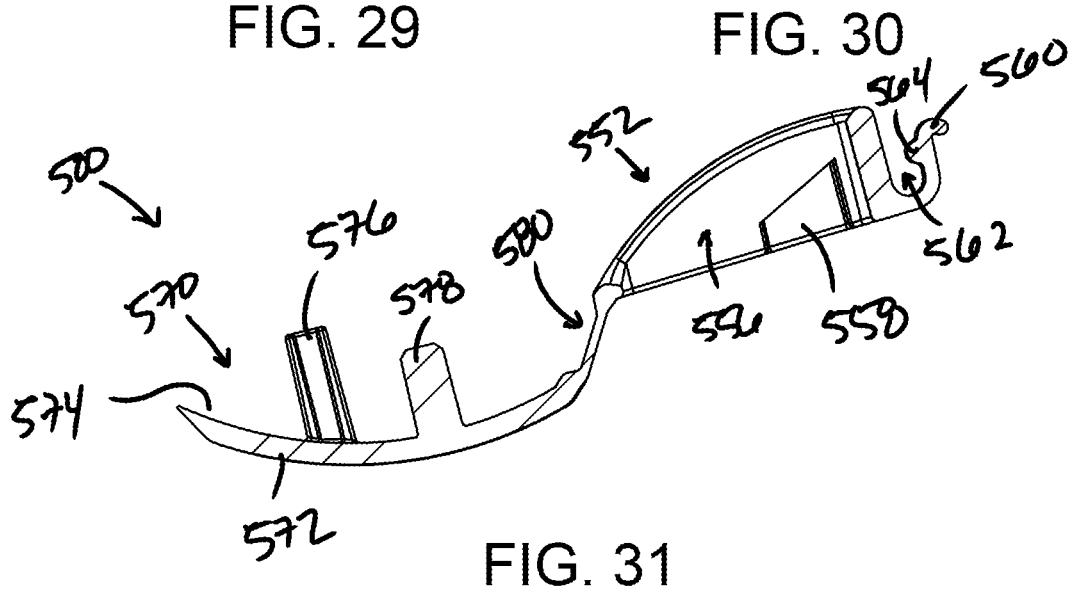
FIG. 31

BEVERAGE HOLDER

BACKGROUND

Typical beverage containers (e.g., cans, bottles, etc.), on their own, can be prone to tipping or spilling. Cup holders and other types of beverage holders can be used to stabilize such beverage containers.

SUMMARY

One embodiment relates to a beverage holder. The beverage holder includes a frame, an insert, and a cover. The frame includes a sidewall having an upper end and a lower end, and a bottom wall extending across the lower end of the sidewall. The upper end defines a plurality of protrusions. The sidewall and the bottom wall cooperatively define a chamber. The insert is coupled to the upper end of the sidewall. The insert includes a peripheral rim defining a plurality of apertures that receive the plurality of protrusions and a flexible collar extending from the peripheral rim and at least partially into the chamber. The flexible collar defines an opening leading to the chamber. The cover includes a plurality of interfaces that engage with the plurality of protrusions to couple the cover to the upper end of the sidewall and to secure the insert between the frame and the cover. The cover defines an aperture that aligns with the chamber of the frame and the opening of the insert.

Another embodiment relates to a beverage holder. The beverage holder includes a support structure and a fabric cover. The support structure defines a chamber configured to receive a beverage container. The support structure has a curved exterior profile. The fabric cover is disposed along the curved exterior profile. The fabric cover has graphics disposed thereon. The fabric cover is configured such that the graphics are not distorted when applied around the curved exterior profile. The fabric cover is selectively removable from the support structure and selectively swappable with a different fabric cover.

Still another embodiment relates to a beverage holder. The beverage holder includes a frame, an insert, a top cover, a base, a body, and an outer cover. The frame defines a chamber. The insert is coupled to an upper end of the frame. The insert extends at least partially into the chamber. The insert defines an opening through which the chamber is accessible. The top cover is coupled to the upper end of the frame, securing the insert between the frame and the top cover. The base is coupled to a lower end of the frame. The body is disposed around the frame and positioned between the top cover and the base. The outer cover has a first end coupled to the upper end of the frame and a second end coupled to the lower end of the frame. The first end is positioned between the frame and the top cover. The second end is positioned between the frame and the base.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 13 is a top view of the body of FIG. 11, according to an exemplary embodiment.

FIG. 14 is a cross-sectional view of the body of FIG. 13, according to an exemplary embodiment.

FIG. 18 is a top view of an end cap of the beverage holder of FIG. 1, according to an exemplary embodiment.

FIG. 19 is a front view of the end cap of FIG. 18, according to an exemplary embodiment.

FIG. 20 is a bottom view of the end cap of FIG. 18, according to an exemplary embodiment.

FIG. 21 is a side view of the end cap of FIG. 18, according to an exemplary embodiment.

FIG. 22 is a rear view of the end cap of FIG. 18, according to an exemplary embodiment.

FIG. 29 is an exterior view of the clip of FIG. 27, according to an exemplary embodiment.

FIG. 30 is an interior view of the clip of FIG. 27, according to an exemplary embodiment.

FIG. 31 is a cross-sectional view of the clip of FIG. 30, according to an exemplary embodiment.

DETAILED DESCRIPTION

Figure 1:
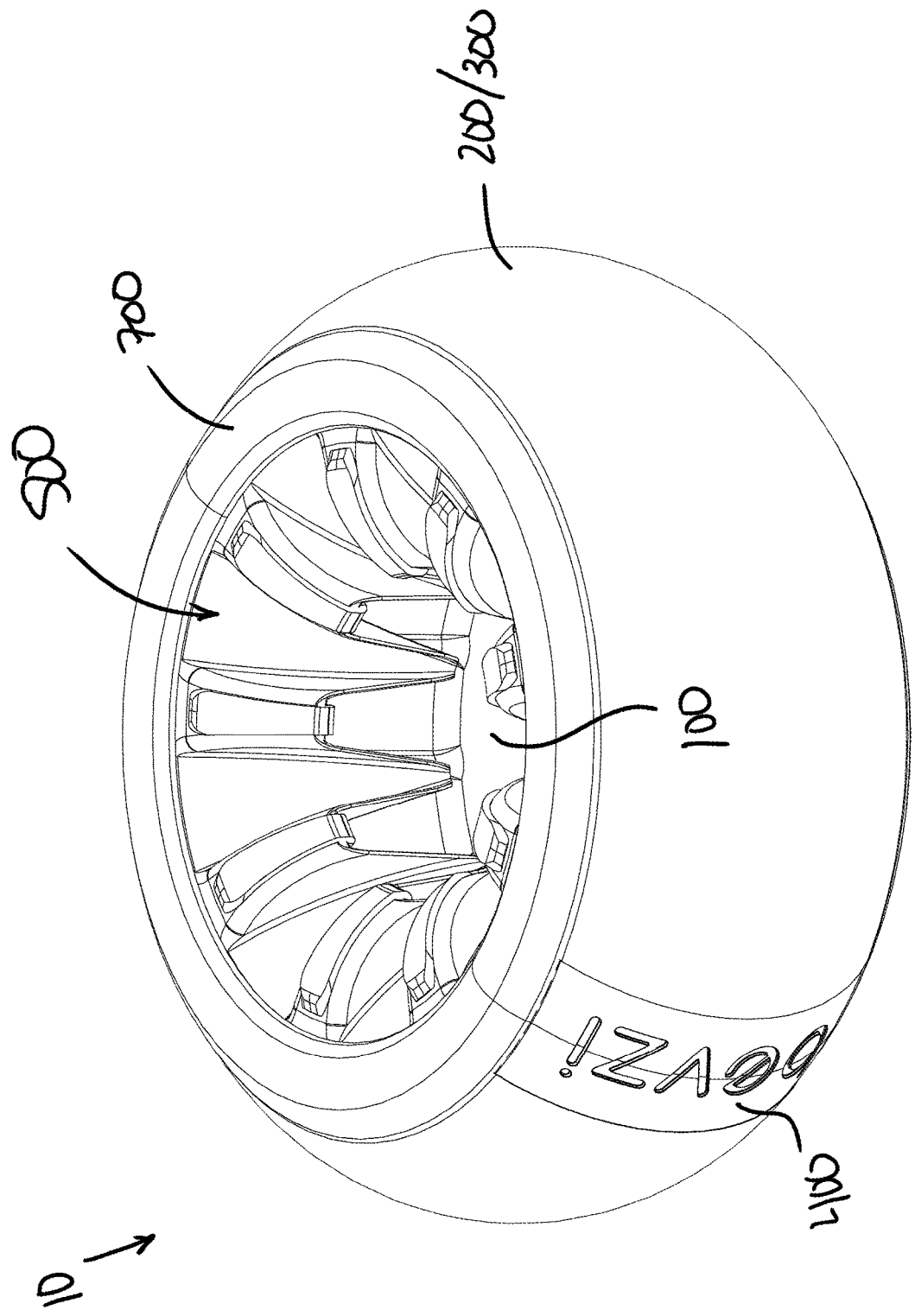
FIG. 1 is a top perspective view of a beverage holder, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a holder of the present disclosure is configured to accept objects (e.g., containers, beverages, phones, etc.) of varying shapes and sizes. The holder is portable and can be used to stabilize the objects received therein such as when placed on surfaces that would cause the objects to otherwise be unstable (e.g., on carpet, on a bed, on padded furniture, within moving vehicles, cars, or boats, etc.). The holder has a low center of gravity and/or a wide base to prevent tipping or spilling, and thereby protects surrounding objects from liquid and/or stain damage. In some embodiments, the holder includes various technological features such as one or more speakers, lights, microphones, a battery, a charging port, a wireless charging assembly, sensors, a camera, heating elements, cooling elements, solar panels, and/or still other features.

According to the exemplary embodiment shown in FIGS. 1-43, a container holder, shown as beverage holder 10, includes a plurality of components or subassemblies including (a) a main structural component, shown as frame 100, (b) a main body, shown as body 200, (c) a body covering, shown outer cover 300, (d) a seam cover, shown as end cap 400, (e) a container retention assembly, shown as bellows assembly 500, (f) a lower cover or base, shown as base plate 600, (g) an upper cover or ring, shown as top ring 700, (h) a weighted plate or disk, shown as counterweight 800, (i) a first plurality of interior spacers or pads, shown as inner spacer pads 802, and (j) a second plurality of exterior spacers or pads, shown as outer foot pads 804. According to an exemplary embodiment, the beverage holder 10 is configured to receive and securely hold/retain a container (e.g., a beverage container, a can, a bottle, etc.) or another item (e.g., a smartphone, etc.) that fits therein. The frame 100, the body 200, the end cap 400, the bellows assembly 500, the base plate 600, and/or the top ring 700 may provide a support structure of the beverage holder 10.

As shown in FIGS. 7-10, the frame 100 of the beverage holder 10 includes (a) a peripheral wall, shown as sidewall 102, having a first end, shown as upper end 104, and an opposing second end, shown as lower end 106, and (b) a bottom wall, shown as bottom 108, positioned proximate and extending across the lower end 106 of the sidewall 102. According to the exemplary embodiment shown in FIGS. 7-10, the sidewall 102 has a cylindrical or substantially cylindrical cross-sectional shape or profile. In other embodiments, the sidewall 102 has another cross-sectional shape or profile. By way of example, the sidewall 102 may have a triangular, square, pentagonal, hexagonal, octagonal, and/or still another suitable cross-sectional shape or profile.

Figure 7:
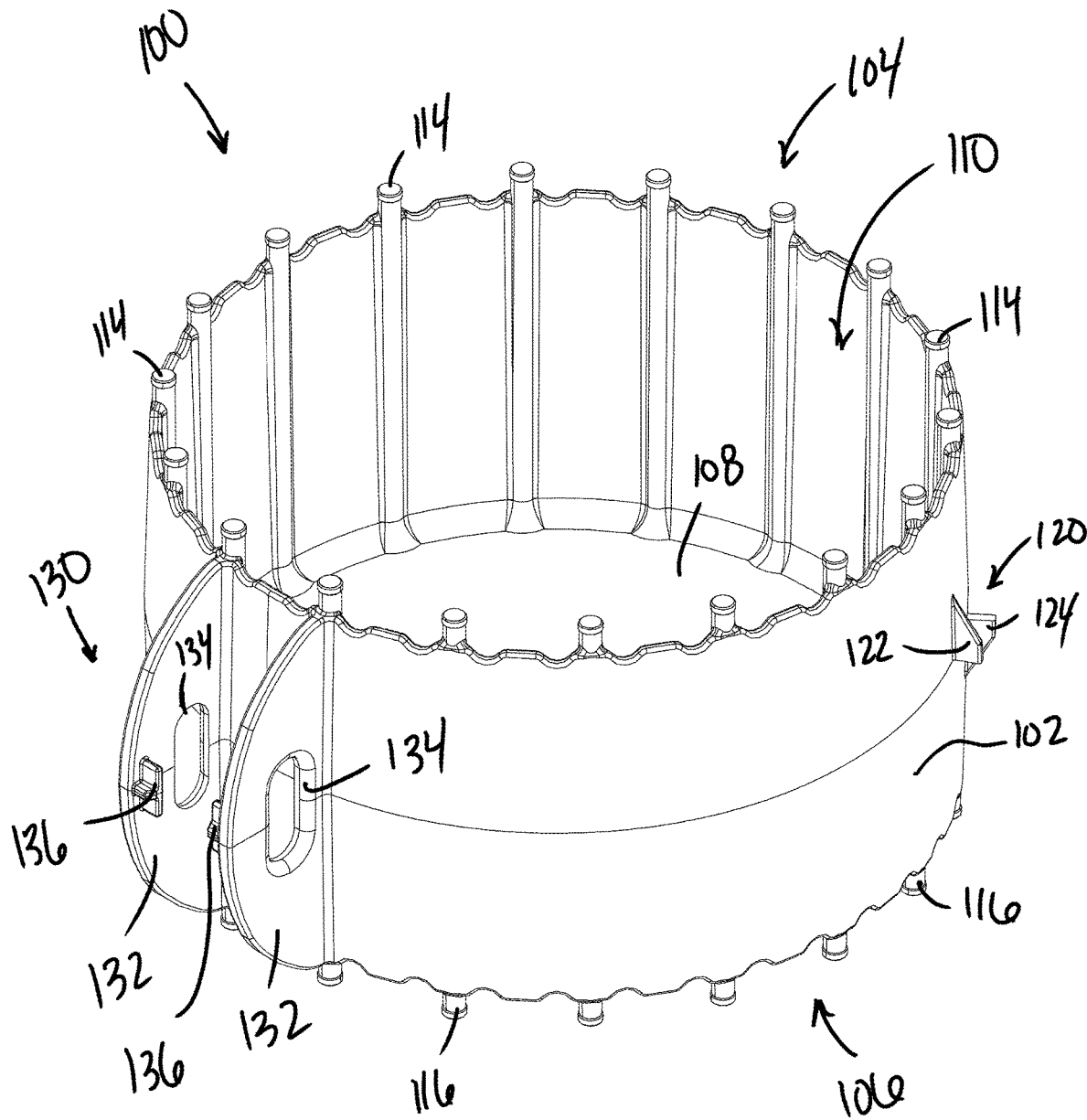
FIG. 7 is a perspective view of a frame of the beverage holder of FIG. 1, according to an exemplary embodiment.
Figure 8:
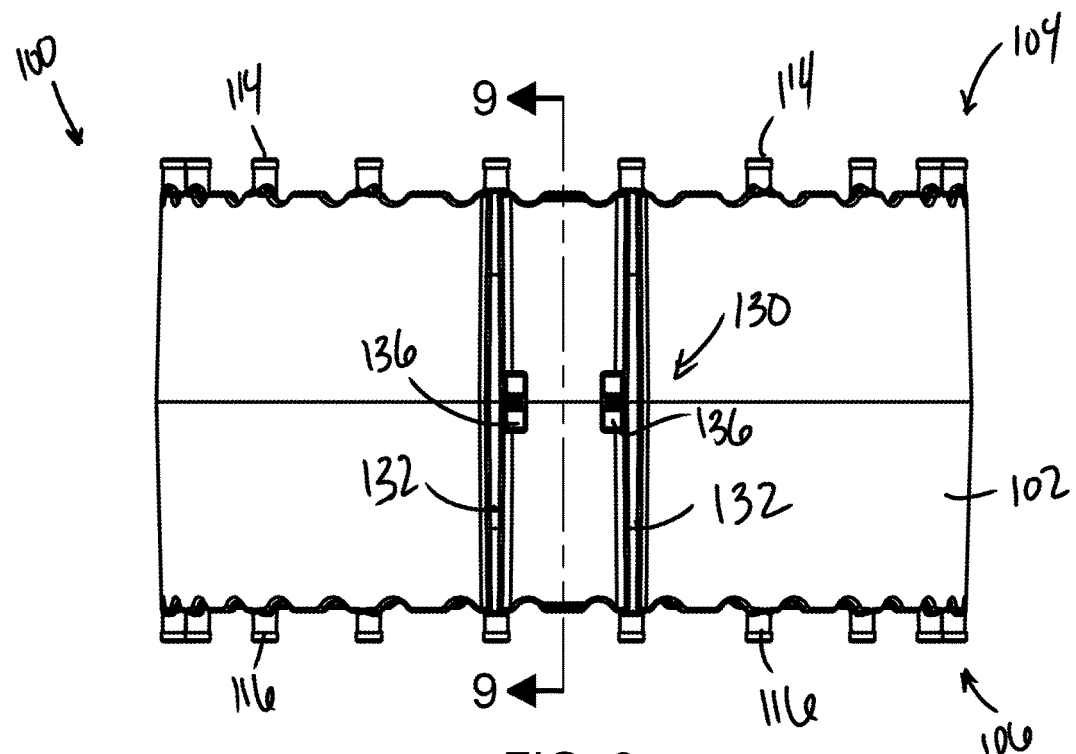
FIG. 8 is a side view of the frame of FIG. 7, according to an exemplary embodiment.
Figure 9:
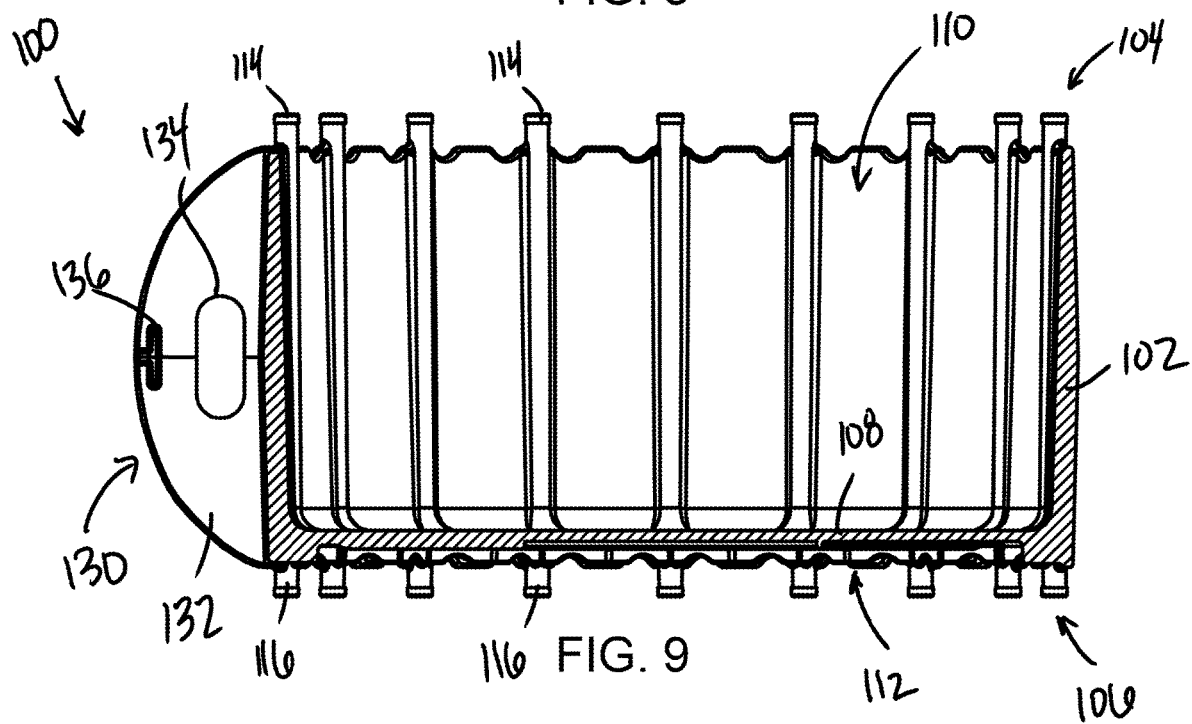
FIG. 9 is a cross-sectional view the frame of FIG. 8, according to an exemplary embodiment.
Figure 10:
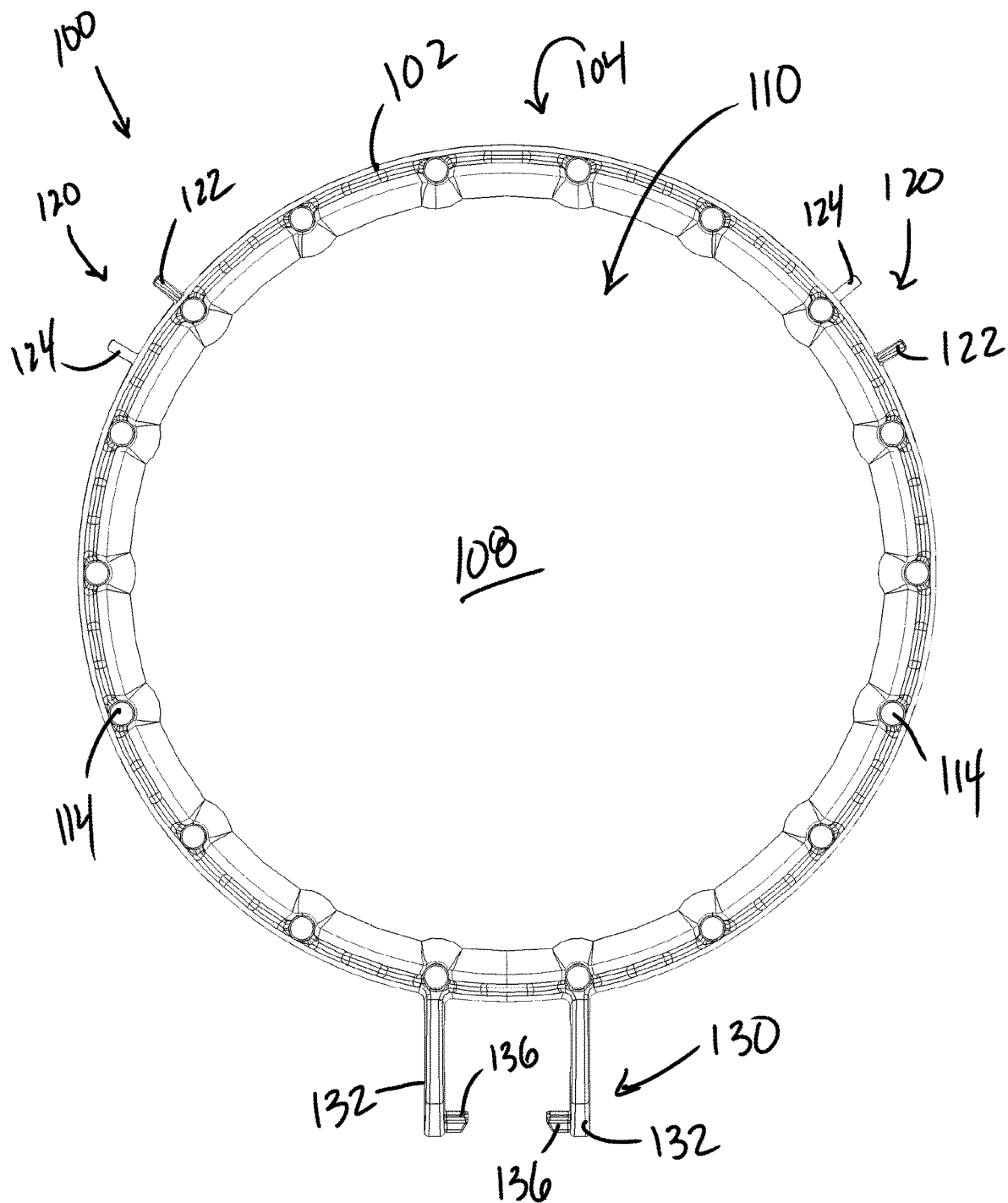
FIG. 10 is a top view of the frame of FIG. 7, according to an exemplary embodiment.

As shown in FIGS. 7, 9, and 10, the sidewall 102 and the bottom 108 cooperatively define a first or upper chamber, shown as beverage cavity 110, and a second or lower chamber, shown as counterweight chamber 112. As shown in FIGS. 7-10, the frame 100 includes a first plurality of interfaces or protrusions, shown as upper annular snap pins 114, extending from the upper end 104 of the sidewall 102 and spaced (e.g., uniformly, periodically, etc.) around the periphery of the upper end 104 of the sidewall 102. As shown in FIGS. 7-9, the frame 100 includes a second plurality of interfaces or protrusions, shown as lower annular snap pins 116, extending from the lower end 106 of the sidewall 102 and spaced (e.g., uniformly, periodically, etc.) around the periphery of the lower end 106 of the sidewall 102.

As shown in FIGS. 7 and 10, the frame 100 includes a first plurality of retaining interfaces (e.g., two interfaces), shown as frame key interfaces 120, positioned about and extending laterally outward from the sidewall 102. Each of the frame key interfaces 120 includes a first protrusion (e.g., a retainer, a flange, a tab, etc.), shown as upper key tab 122, and a second protrusion, shown as lower key tab 124. The upper key tabs 122 and the lower key tabs 124 are offset from one another such that the lower key tabs 124 are (a) positioned at least partially beneath the upper key tabs 122 and (b) angularly offset relative to the upper key tabs 122.

As shown in FIGS. 7-10, the frame 100 includes a locking or securing interface, shown as frame interlocking interface 130, including a pair of flanges, shown as interlocking flanges 132, extending laterally outward from the sidewall 102 (e.g., on a side of the sidewall 102 opposite the frame key interfaces 120). The interlocking flanges 132 are spaced from one another such that a gap is defined therebetween. According to the exemplary embodiment shown in FIGS. 7 and 9, the interlocking flanges 132 have an arcuate shape (e.g., to match the profile of the body 200). In other embodiments, the interlocking flanges 132 have another shape (e.g., square, rectangular, trapezoidal, hemispherical, triangular, etc.). As shown in FIGS. 7 and 9, each of the interlocking flanges 132 defines an aperture (e.g., a hole, an elongated slot, etc.), shown as interlocking aperture 134. As shown in FIGS. 7-10, each of the interlocking flanges 132 includes a protrusion, shown as tabs 136, extending from an interior surface thereof toward the other one of the interlocking flanges 132.

As shown in FIGS. 11-15, the body 200 has a core structure, shown as core 202, having a first end, shown upper end 204, an opposing second end, shown as lower end 206, a first surface, shown as exterior surface 208, and an opposing second surface, shown as interior surface 210. According to an exemplary embodiment, the core 202 is manufactured from a foam or foam-like material (e.g., closed cell foam, etc.). In some embodiments, the core 202 provides an insulating feature that helps maintain a temperature of an object (e.g., a warm beverage, a cold beverage, etc.) received by the beverage holder 10. In some embodiments, the beverage holder 10 includes an independent insulation layer positioned between the body 200 and the frame 100, and/or within the frame 100. According to the exemplary embodiment shown in FIGS. 11-15, the exterior surface 208 has an arcuate shape and the interior surface 210 has a cylindrical or substantially cylindrical shape such that the core 202 has a toroidal-like shape or structure. In other embodiments, the core 202 has another shape or structure (e.g., cube-like, sphere-like, cylinder-like, hemisphere-like, etc.).

Figure 11:
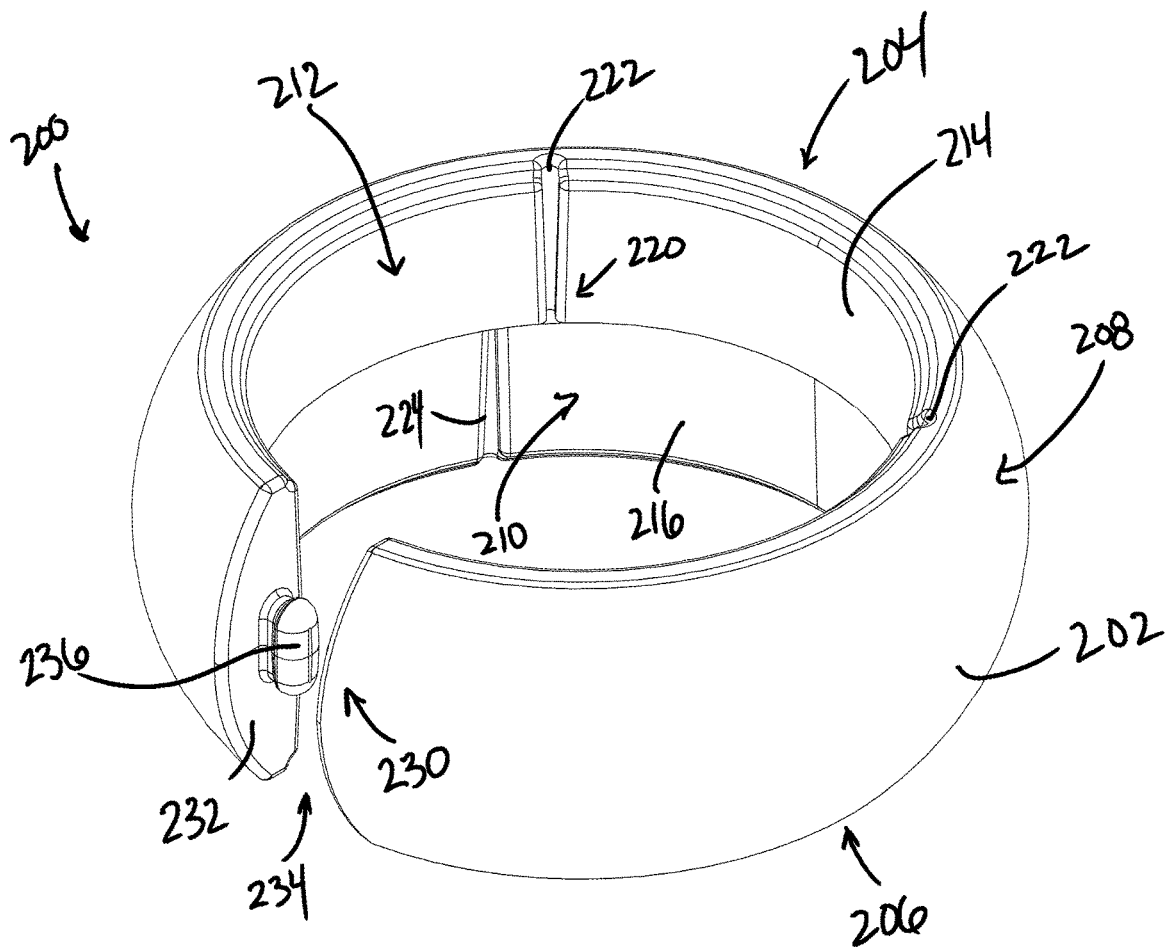
FIG. 11 is a perspective view of a body of the beverage holder of FIG. 1, according to an exemplary embodiment.
Figure 15:
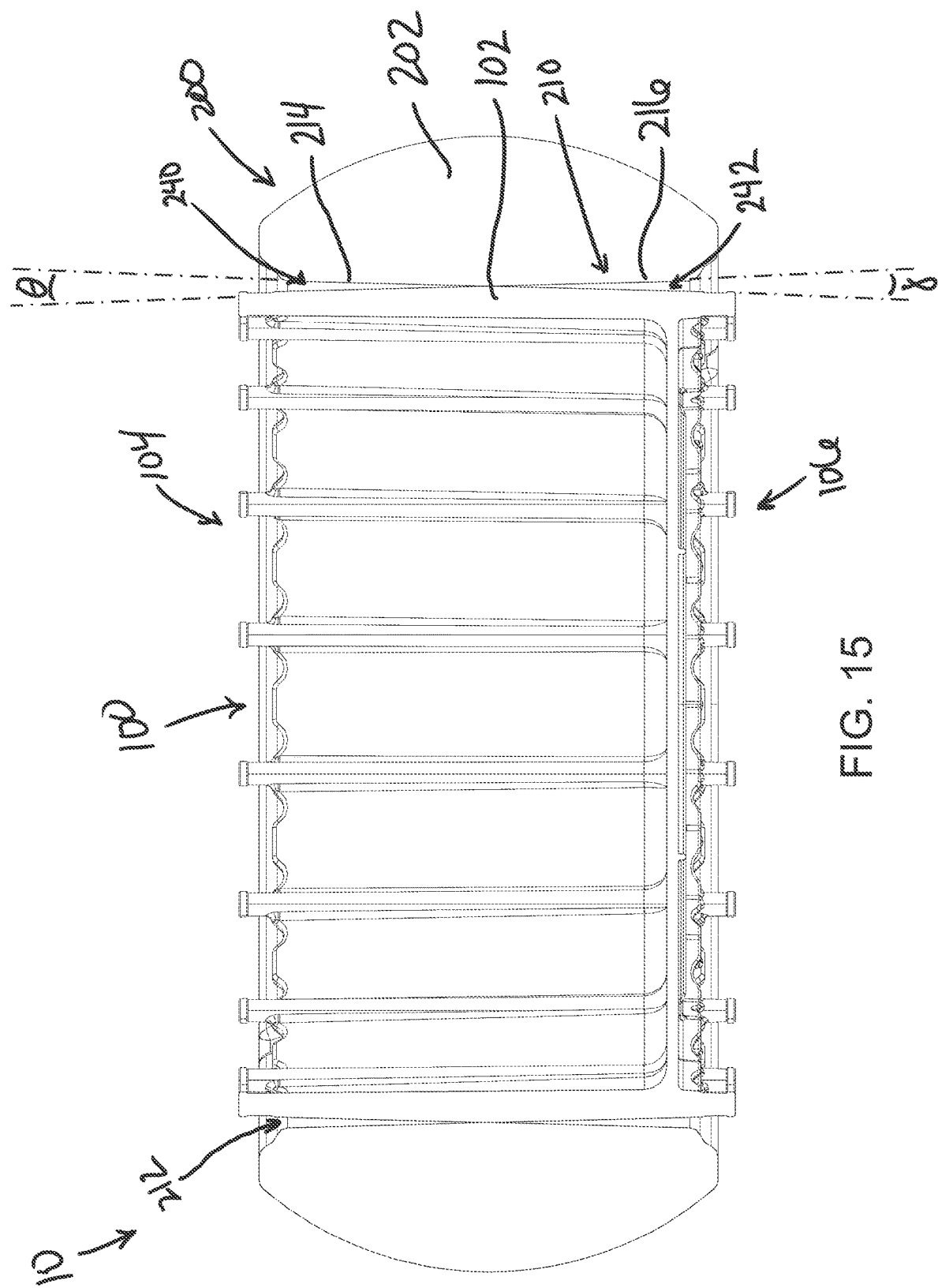
FIG. 15 is a cross-sectional view of the body of FIG. 11 assembled with the frame of FIG. 7, according to an exemplary embodiment.

As shown in FIGS. 11 and 13-15, the interior surface 210 of the core 202 defines a through hole, shown as frame passage 212. As shown in FIG. 15, the frame passage 212 engages with and receives the sidewall 102 of the frame 100. As shown in FIGS. 11, 14, and 15, the interior surface 210 has a first portion, shown as upper portion 214, and a second portion, shown as lower portion 216. As shown in FIGS. 11, 13, and 14, the interior surface 210 defines a second plurality of retaining interfaces (e.g., two interfaces), shown as core key interfaces 220, positioned about and defined by the interior surface 210. Each of the core key interfaces 220 includes a first recess (e.g., a retainer, a slot, a detent, a notch etc.), shown as upper key slot 222, positioned along the upper portion 214 of the interior surface 210 and a second recess, shown as lower key slot 224, positioned along the lower portion 216 of the interior surface 210. The upper key slots 222 and the lower key slots 224 are offset from one another such that the lower key slots 224 are (a) positioned at least partially beneath the upper key slots 222 and (b) angularly offset relative to the upper key slots 222. According to an exemplary embodiment, the frame key interfaces 120 of the frame 100 are positioned to engage with and be received by the core key interfaces 220 of the body 200 when the frame 100 is received within the frame passage 212 of the core 202. Such engagement between the frame key interfaces 120 and the core key interfaces 220 is configured to prevent unintentional rotation and axial displacement of the frame 100 and the body 200 relative to each other during assembly of the beverage holder 10.

Figure 12:
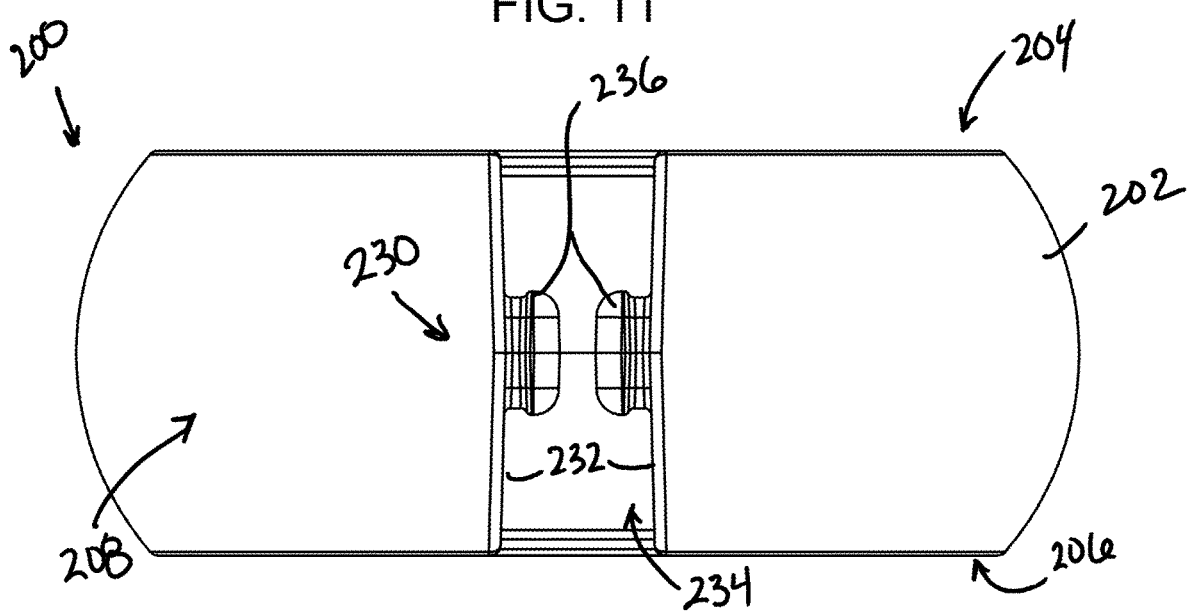
FIG. 12 is a front view of the body of FIG. 11, according to an exemplary embodiment.

As shown in FIGS. 11-13, the core 202 defines an interlocking interface, shown as core interlocking interface 230. The core interlocking interface 230 includes opposing end faces, shown as end faces 232, of the core 202 that are spaced a distance apart such that a gap, shown as flange slot 234, is defined in the core 202 and extends therethrough. Each of the end faces 232 includes a flange interface or protrusion, shown as flange retainer 236, extending therefrom. According to an exemplary embodiment, the flange retainers 236 have a shape (e.g., pill shape, obround, etc.) that is substantially the same as the interlocking apertures 134 of the interlocking flanges 132.

Figure 5:
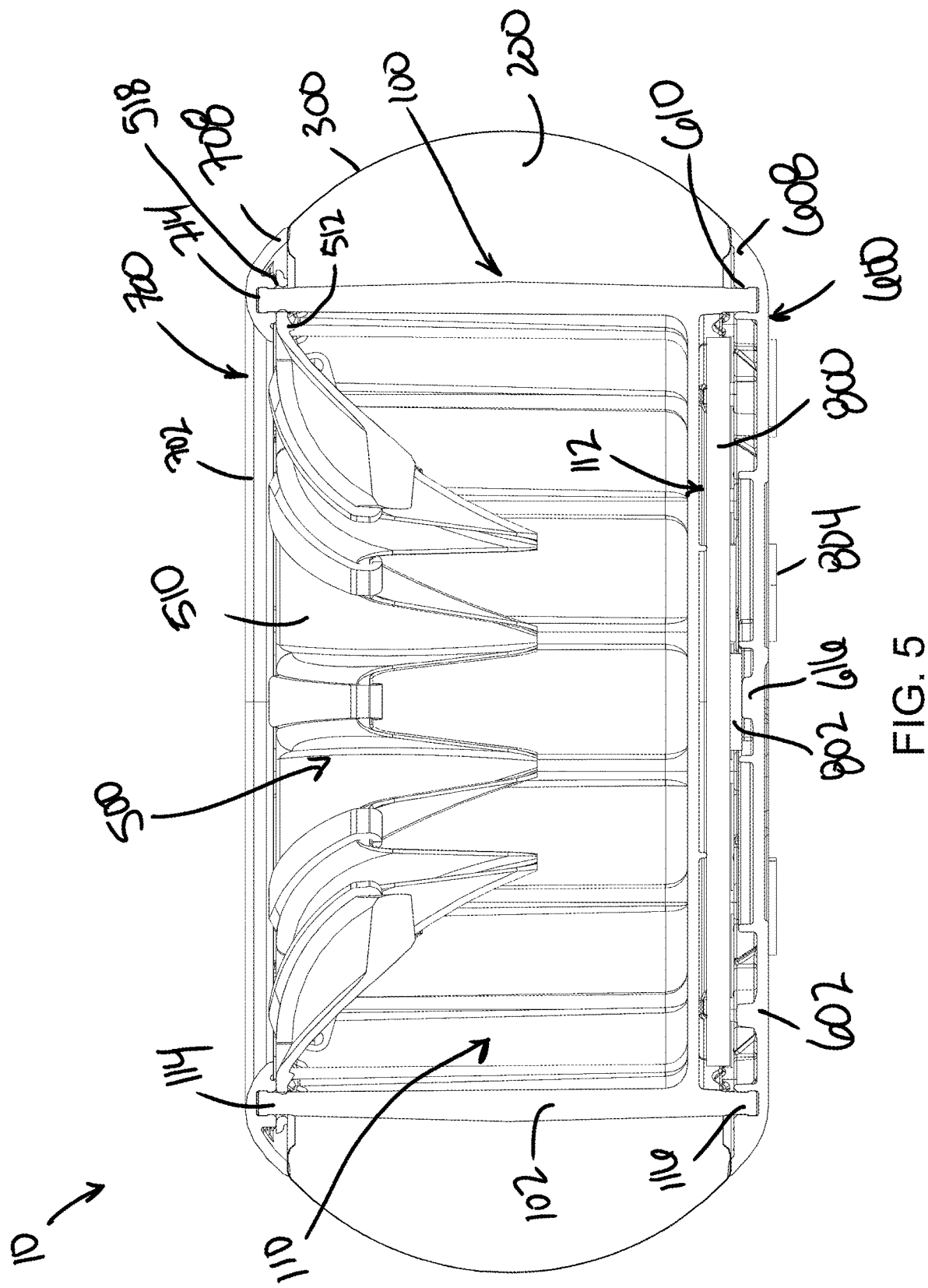
FIG. 5 is a first cross-sectional view of the beverage holder of FIG. 3, according to an exemplary embodiment.
Figure 6:
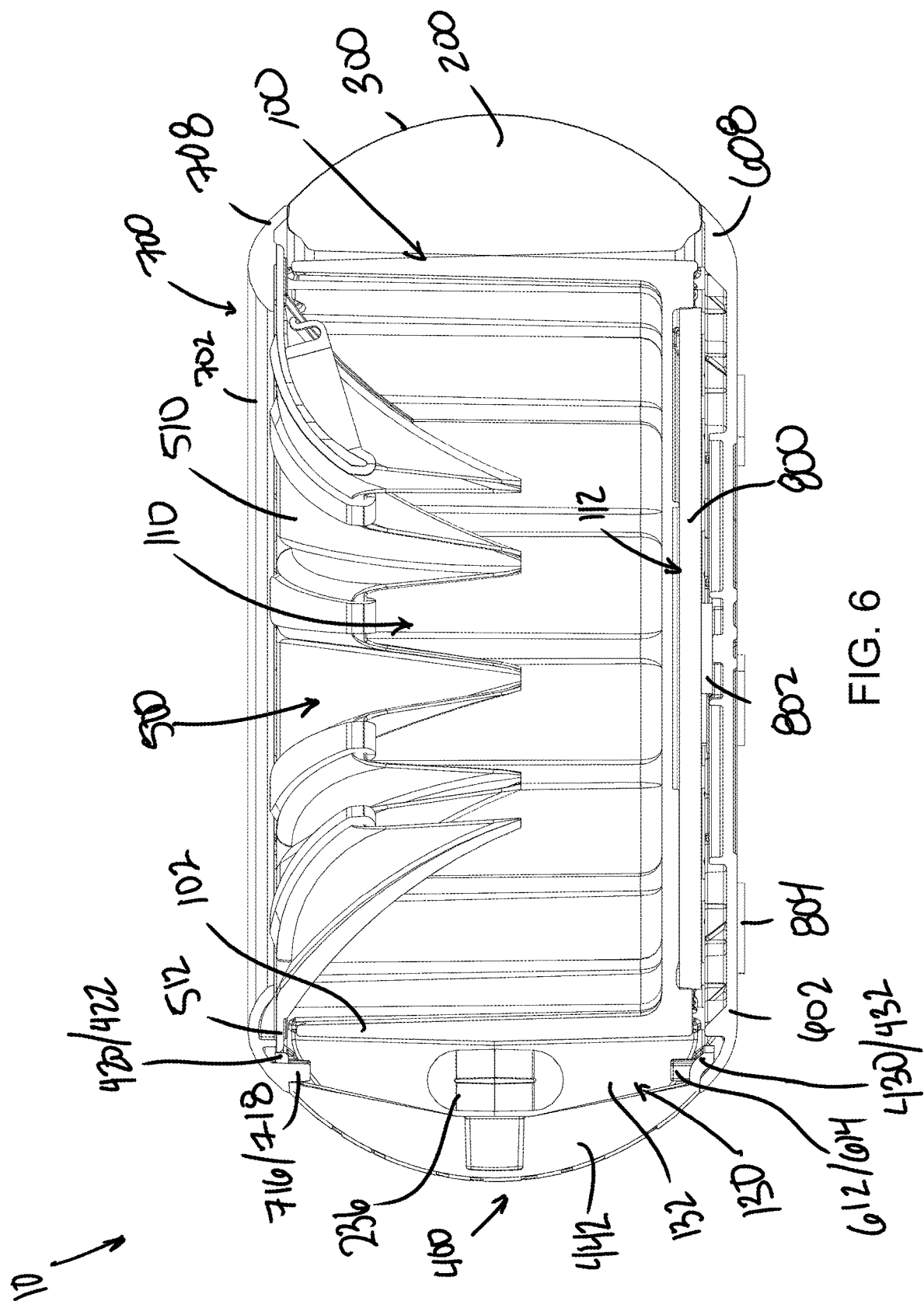
FIG. 6 is a second cross-sectional view of the beverage holder of FIG. 3, according to an exemplary embodiment.

As shown in FIGS. 5, 6, and 15, the core 202 is coupled to and fits around the sidewall 102 of the frame 100. More specifically, (a) the sidewall 102 of the frame 100 is received by and extends through the frame passage 212 such that the interior surface 210 of the core 202 is disposed around the sidewall 102, (b) the frame key interfaces 120 of the frame 100 engage with the core key interfaces 220 such that (i) the upper key tabs 122 of the frame 100 are received by the upper key slots 222 of the core 202 and (ii) the lower key tabs 124 of the frame 100 are received by the lower key slots 224 of the core, and (c) the frame interlocking interface 130 engages with the core interlocking interface 230 such that (i) the end faces 232 of the core 202 engage with the outer faces of the interlocking flanges 132 of the frame 100 and (ii) the flange retainers 236 of the core 202 are received by and extend through the interlocking apertures 134 of the interlocking flanges 132.

As shown in FIG. 15, the upper portion 214 of the interior surface 210 of the core 202 is slightly angled (e.g., 3 degrees, 5 degrees, 10 degrees, less than 15 degrees, less than 10 degrees, etc.) relative to the sidewall 102 of the frame 100 at a first angle or angle θ such that a first gap, shown as upper gap 240, is present between the upper portion 214 of the interior surface 210 of the core 202 and the sidewall 102 of the frame 100 when the core 202 is installed onto the frame 100. Similarly, the lower portion 216 of the interior surface 210 of the core 202 is slightly angled relative to the sidewall 102 of the frame 100 at a second angle or angle γ such that a second gap, shown as lower gap 242, is present between the lower portion 216 of the interior surface 210 of the core 202 and the sidewall 102 of the frame 100 when the core 202 is installed onto the frame 100. The angled structure of the interior surface 210 may facilitate inserting the sidewall 102 of the frame 100 through the frame passage 212 of the core 202 more easily during assembly. In one embodiment, the angle θ and the angle γ are substantially the same. In other embodiments, the angle θ and the angle γ are different. In some embodiments, only one of the upper portion 214 or the lower portion 216 is angled relative to the sidewall 102 of the frame 100. In other embodiments, neither the upper portion 214 nor the lower portion 216 is angled relative to the sidewall 102 of the frame 100.

Figure 16:
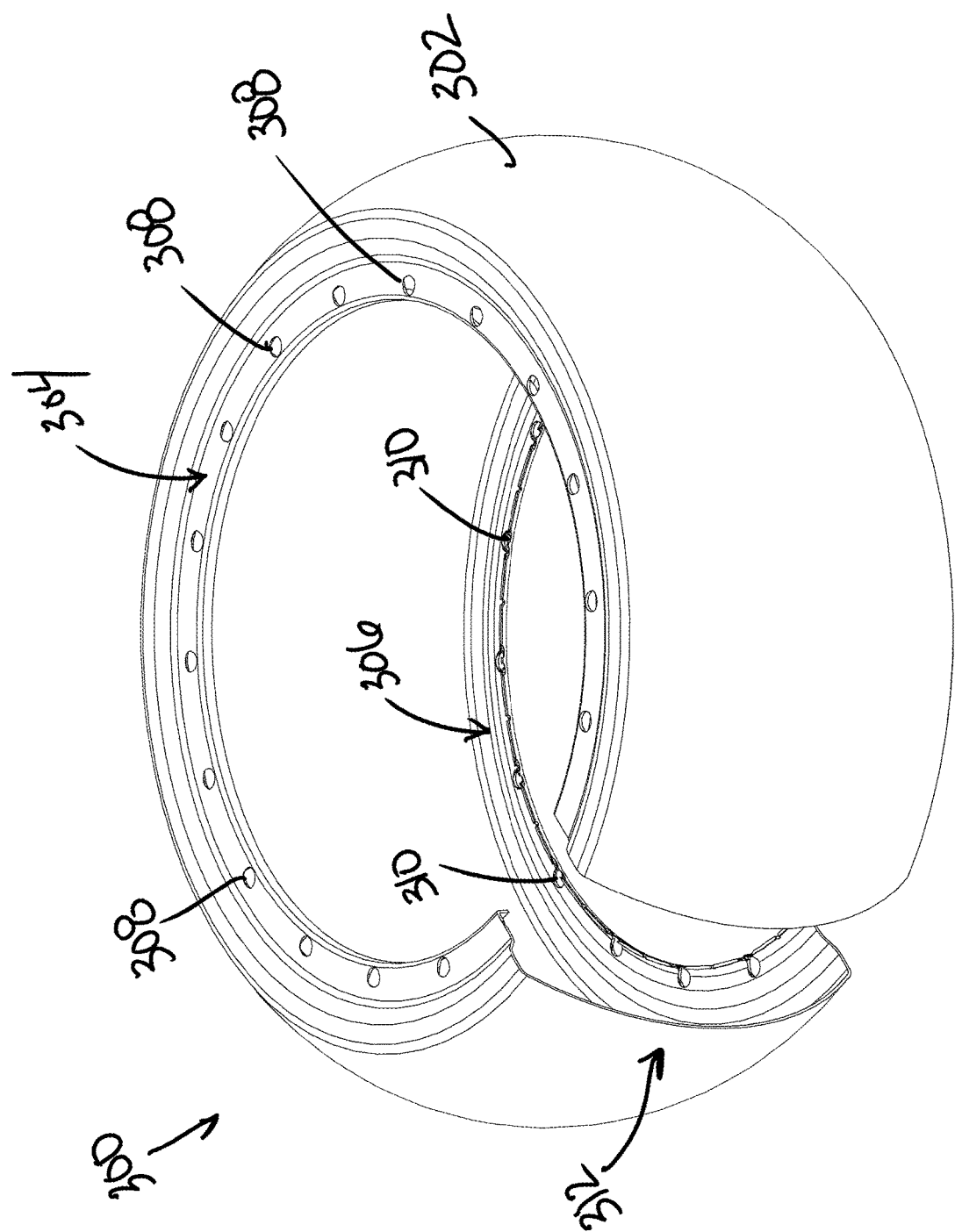
FIG. 16 is a perspective view of a cover of the beverage holder of FIG. 1, according to an exemplary embodiment.
Figure 17:
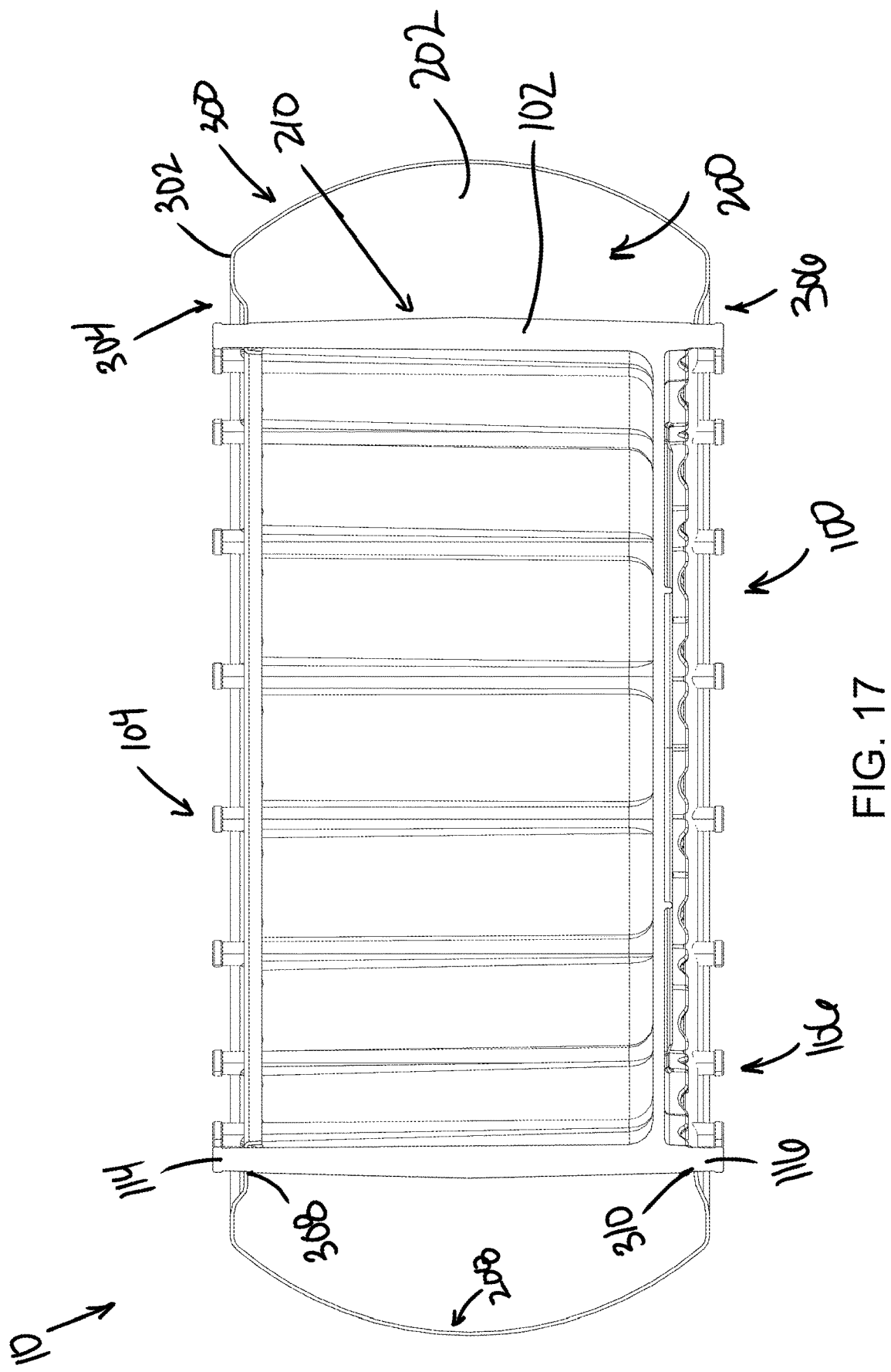
FIG. 17 is a cross-sectional view of the cover of FIG. 16 assembled with the body of FIG. 11 and the frame of FIG. 7, according to an exemplary embodiment.

As shown in FIGS. 16 and 17, the outer cover 300 includes a layer of material, shown as fabric layer 302, having a first end, shown upper end 304, an opposing second end, shown as lower end 306. The upper end 304 defines a first plurality of apertures, shown as upper apertures 308, spaced along the edge thereof and the lower end 306 defines a second plurality of apertures, shown as lower apertures 310, spaced along the edge thereof. As shown in FIG. 17, the outer cover 300 engages with and fits around the exterior surface 208 of the core 202 of body 200 where (a) the upper apertures 308 along the upper end 304 interface with the upper annular snap pins 114 positioned at the upper end 104 of the sidewall 102 of the frame 100 and (b) the lower apertures 310 along the lower end 306 interface with the lower annular snap pins 116 positioned at the lower end 106 of the sidewall 102 of the frame 100. Such engagement may facilitate releasably coupling the outer cover 300 to the frame 100 and about the core 202 (e.g., to facilitate swapping "skins" or fabric layers 302). In some embodiments, the outer cover 300 is not removable after attachment. By way of example, the outer cover 300 may be additionally secured to the core 202 (e.g., using adhesive). As shown in FIG. 17, the fabric layer 302 is configured (e.g., sized, designed, etc.) to pull or compress the core 202 against the frame 100 so as to remove or close the upper gap 240 and the lower gap 242 to provide a tight and secure fit between the sidewall 102 of the frame and the interior surface 210 of the core 202.

According to an exemplary embodiment, the fabric layer 302 is manufactured from a material with minimal stretch properties. Such minimal stretch properties may prevent or minimize vertical distortion of graphics on the fabric layer 300 when applied to complex surfaces (i.e., non-flat surfaces). In addition, the engagement of the outer cover 300 with the upper annular snap pins 114 and the lower annular snap pins 116 may keep the fabric layer 302 in alignment and not twist or skew horizontally about the core 202, thereby preventing or minimizing horizontal distortion of graphics that may otherwise occur due to horizontal skewing. By way of example, the fabric layer 302 may be manufactured from a woven material (e.g., polyester, etc.) with a 45-degree bias of the weave to provide a "no-stretch" fabric to maintain the tautness of the outer cover 300 around the core 202. By way of another example, the fabric layer 302 may be manufactured from a non-woven material (e.g., leather, synthetic leather, etc.). The non-woven material may be naturally non-stretch or may include a woven backing layer with a 45-degree bias of the weave to provide a no-stretch fabric to maintain the tautness of the outer cover 300 around the core 202. According to an exemplary embodiment, the no-stretch or minimal stretch properties of the fabric layer 302 prevent any distortion of graphics printed or otherwise disposed along the fabric layer 302 when the outer cover 300 is applied to the complex, curved surfaces of the core 202. By way of example, logos (e.g., of companies, of sports teams, etc.), symbols, and/or other graphics (e.g., patterns, pictures, etc.) may be disposed along the fabric layer 302. Such graphics may be printed onto the fabric layer 302 using dye sublimation, inkjet printing, and/or other suitable printing methods. As used herein, "no-stretch" should be understood to mean that the fabric layer 302 minimally stretches when applied to the cover 202 such that graphics on the fabric layer 302 exhibit no or minimal distortion when the fabric layer 302 is applied to complex shapes (e.g., such as a toroid).

In an alternative embodiment, the fabric layer 302 is manufactured from a stretchable material (e.g., spandex, Lycra®, elastane, nylon, etc.). By way of example, the fabric layer 302 may be sized smaller than the core 202 and then stretched about the 202 (e.g., to compress the core 202 against the frame 100 to remove or close the upper gap 240 and the lower gap 242). Such a stretchable material may be used in embodiments where the outer cover 300 is removable.

As shown in FIG. 16, the outer cover 300 is configured (e.g., sized) such that a gap, shown as end cap slot 312, is defined between the opposing ends of the fabric layer 302. According to an exemplary embodiment, the end cap slot 312 coincides and aligns with the flange slot 234 of the core 202 and the frame interlocking interface 130 to receive and accommodate the end cap 400.

As shown in FIGS. 18-22, the end cap 400 includes a main body portion, shown as outer wall 402, having a first end, shown upper end 404, an opposing second end, shown as lower end 406, a first surface, shown as exterior surface 408, and an opposing second surface, shown as interior surface 410. According to an exemplary embodiment, the exterior surface 408 is shaped (e.g., curved) to match the shape of the exterior surface of the core 202. As shown in FIGS. 18-22, the end cap 400 includes (a) a first interface, shown as upper flange 420, extending from the upper end 404 of the outer wall 402, (b) a second interface, shown as lower flange 430, extending from the lower end 406 of the outer wall 402, and (c) a support assembly, shown as rib assembly 440, disposed along the interior surface 410 of the outer wall 402 and extending between the upper end 404 and the lower end 406 thereof. As shown in FIGS. 18, 19, and 22, the upper flange 420 defines a first aperture, shown as upper retaining aperture 422. As shown in FIGS. 19, 20, and 22, the lower flange 430 defines a pair of second apertures, shown as lower retaining apertures 432, with a divider, shown as dividing rib 434, separating the lower retaining apertures 432. Accordingly, the upper flange 420 and the lower flange 430 do not have the same structure. Such different structures facilitate proper assembly of the beverage holder 10 by preventing incorrect component arrangement (as described in more detail herein). In other embodiments, the upper flange 420 and the lower flange 430 are the same.

As shown in FIGS. 21 and 22, the rib assembly 440 includes (a) a first plurality of ribs, shown as upper and lower ribs 442, extending from the upper end 404 and the lower end 406 toward the center of the outer wall 402 and (b) a second plurality of ribs, shown as center ribs 444, extending between the upper and lower ribs 442. The center ribs 444 are offset inward relative to the upper and lower ribs 442 such that recesses, shown as rib detents 446, are defined by the rib assembly 440. According to the exemplary embodiment shown in FIG. 22, the rib assembly 440 includes three upper and lower ribs 442 and two center ribs 444. In other embodiments, the rib assembly 440 includes a different number of the upper and lower ribs 442 and/or the center ribs 444. According to an exemplary embodiment, when the beverage holder 10 is assembled, the end cap 400 engages with the frame interlocking interface 130 of the frame 100 such that the tabs 136 of the interlocking flanges 132 of the frame interlocking interface 130 interface with the rib detents 446 of the end cap 400.

As shown in FIGS. 23-35, the bellows assembly 500 includes a container insert, shown as bellows 510, a plurality of slide pads, shown as slide clips 550, coupled to the bellows 510, and a biasing or retaining element, shown as garter spring 590, extending between the slide clips 550. In some embodiments, the bellows assembly 500 does not include the slide clips 550 and/or the garter spring 590. As shown in FIGS. 23-26, 34, and 35, the bellows 510 includes a first portion or peripheral rim, shown as outer lip 512, and a second portion or webbing, shown as flexible collar 520, extending inwards and downward from the outer lip 512. The outer lip 512 (a) has a first side, shown as upper side 514, and an opposing second side, shown as lower side 516, and (b) defines a plurality of apertures, shown as pin apertures 518. The flexible collar 520 includes (a) a plurality of depressed portions or valleys, shown as recesses 522, and (b) a plurality of raised portions or ribs, shown as ridges 530, alternating about and extending from the outer lip 512.

Figure 23:
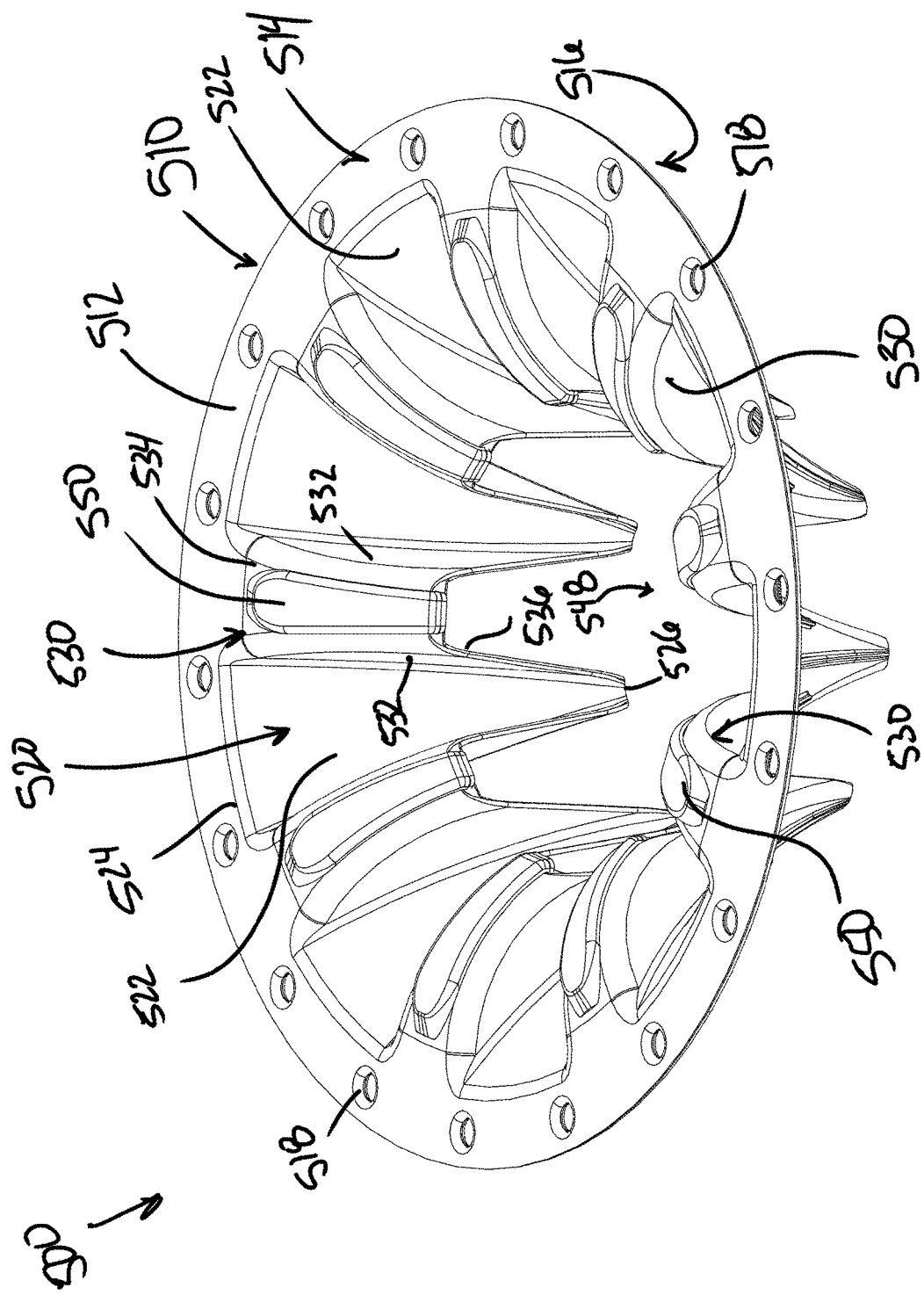
FIG. 23 is a perspective view of a bellows assembly of the beverage holder of FIG. 1, according to an exemplary embodiment.
Figure 24:
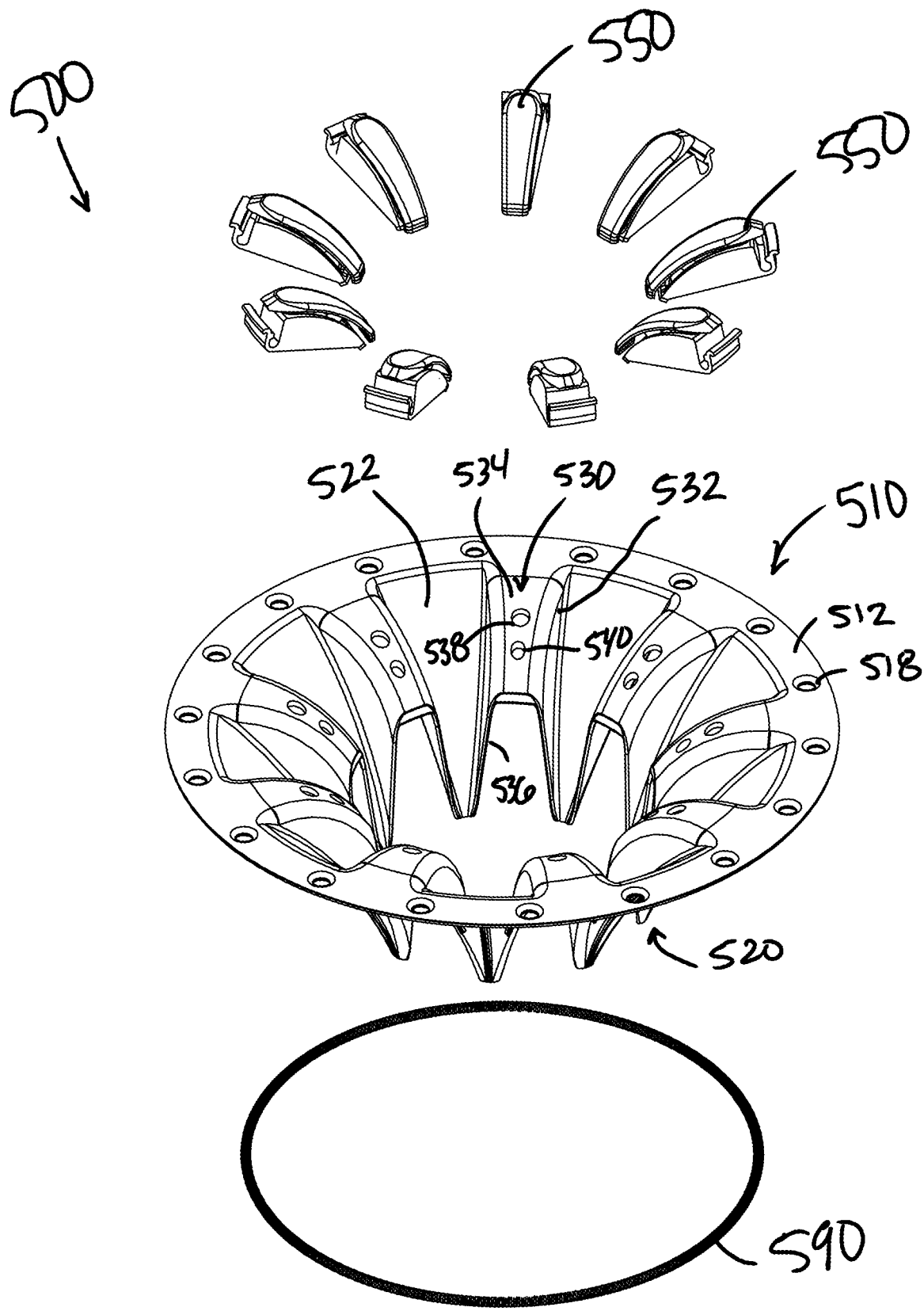
FIG. 24 is an exploded view of the bellows assembly of FIG. 23, according to an exemplary embodiment.
Figure 25:
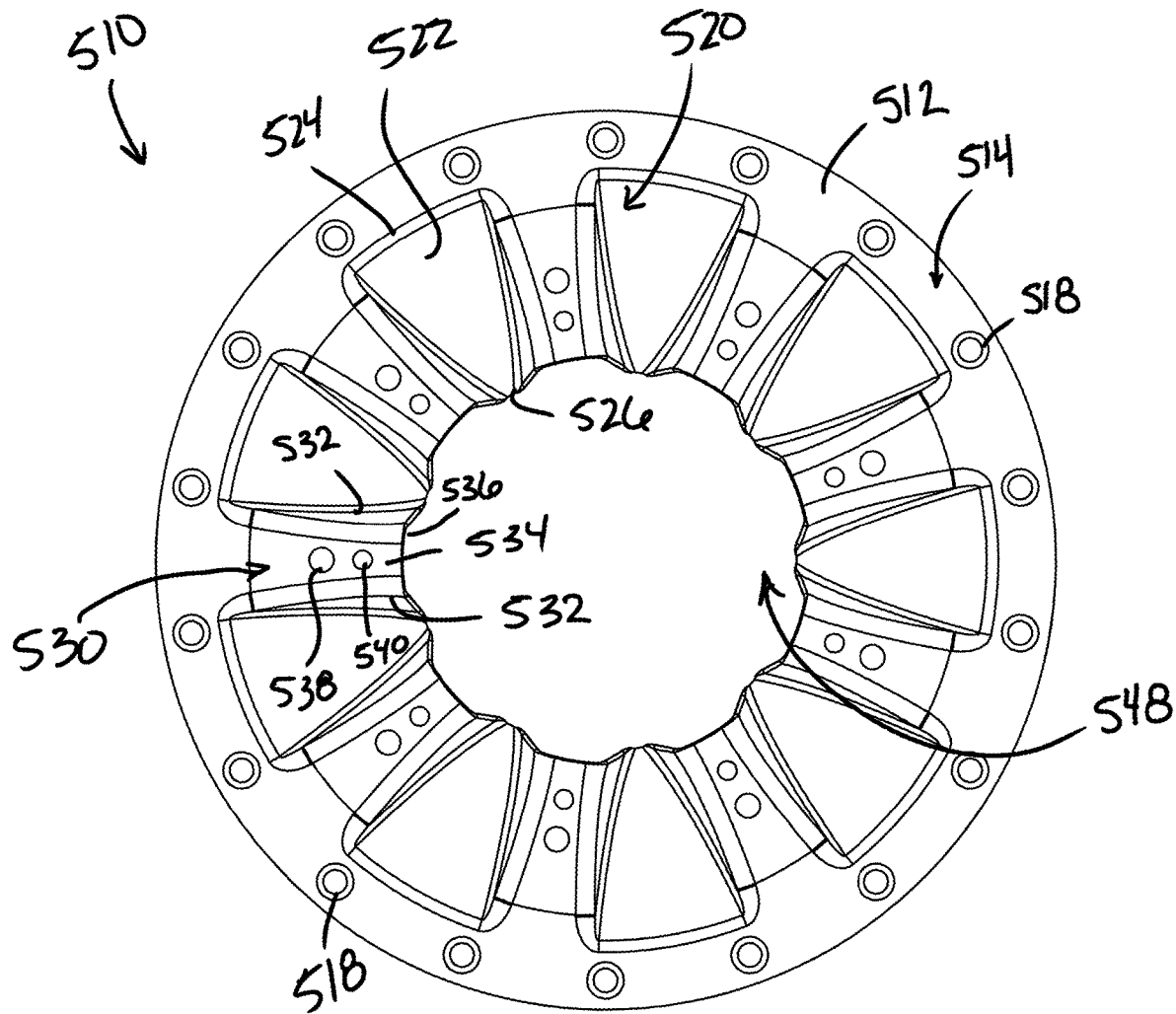
FIG. 25 is a top view of a bellows of the bellows assembly of FIG. 23, according to an exemplary embodiment.
Figure 26:
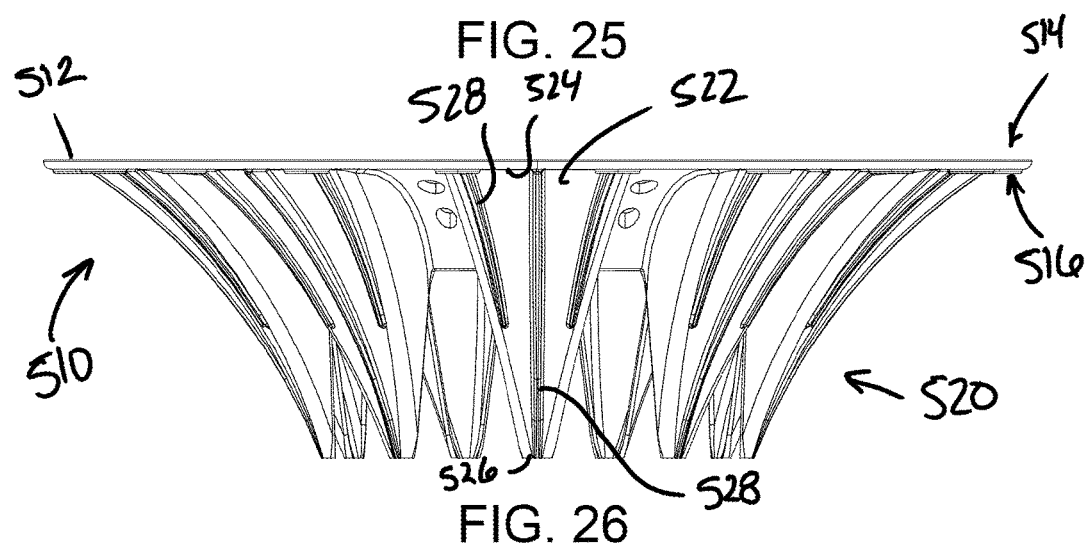
FIG. 26 is a side view of the bellows of FIG. 25, according to an exemplary embodiment.
Figure 27:
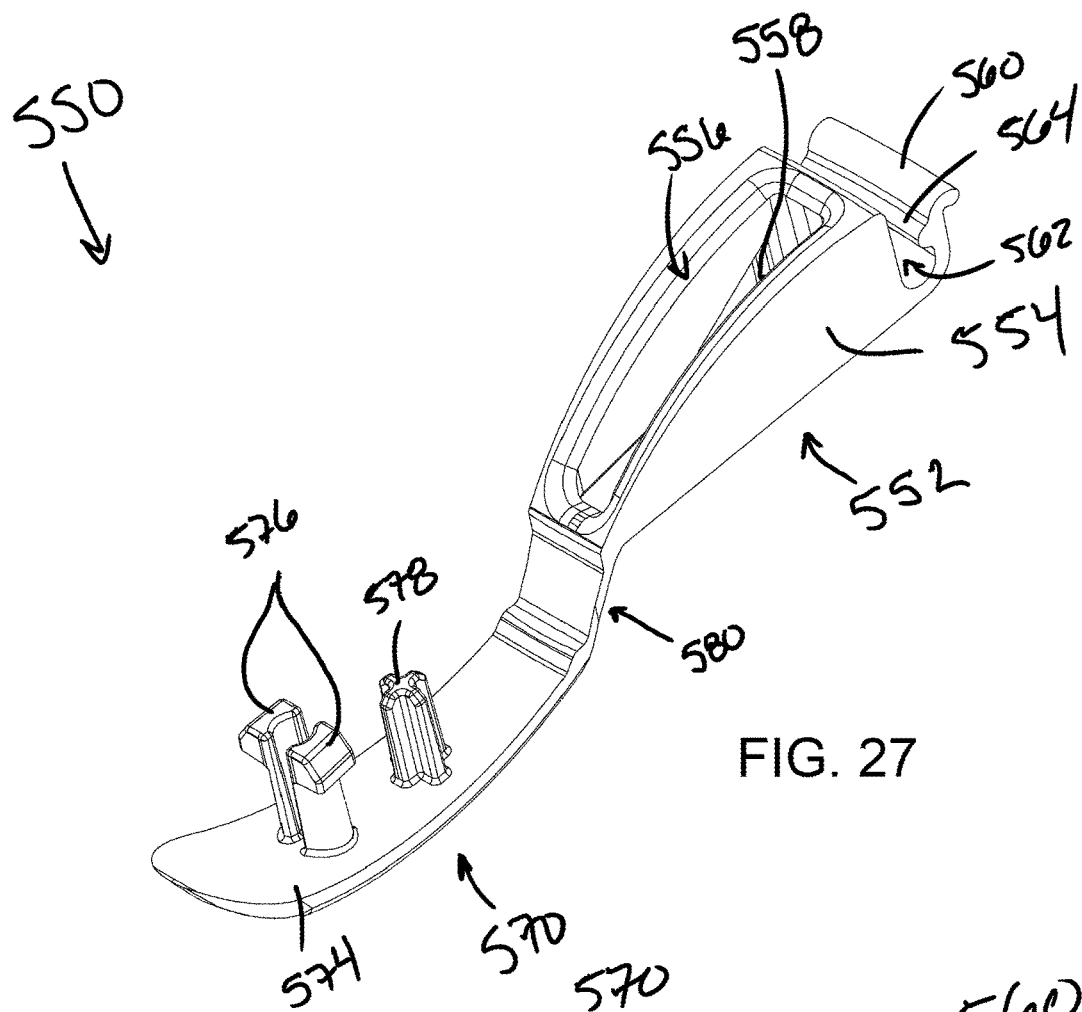
FIG. 27 is a perspective view of a clip of the bellows assembly of FIG. 23 in a first configuration, according to an exemplary embodiment.
Figure 28:
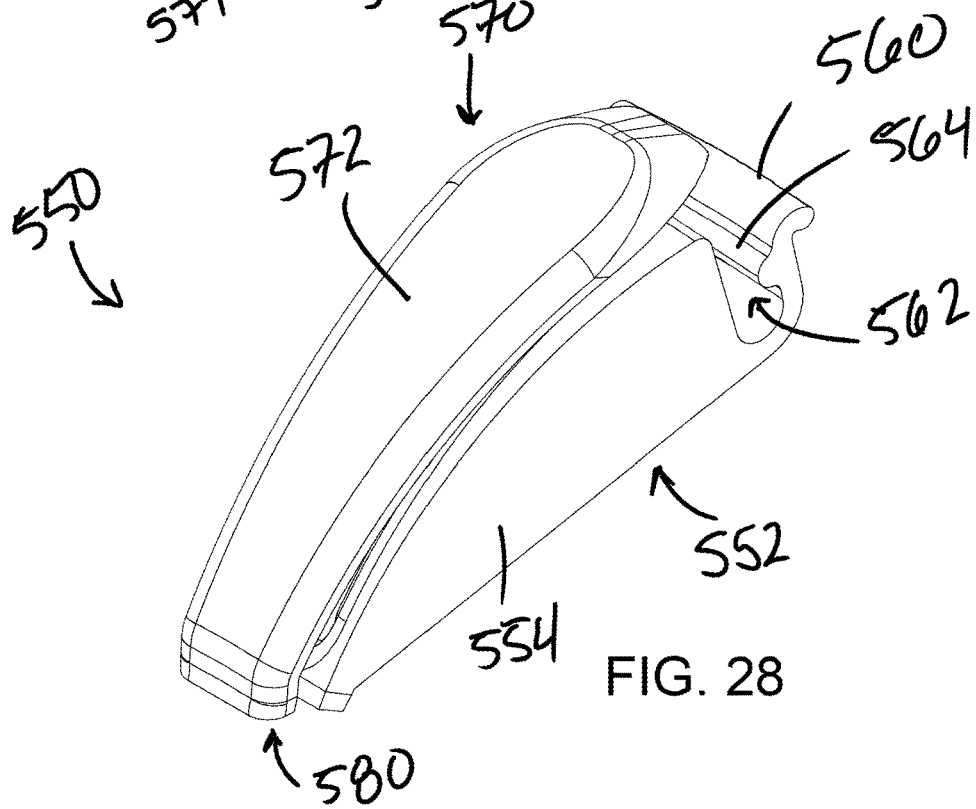
FIG. 28 is a perspective view of the clip of FIG. 27 in a second configuration, according to an exemplary embodiment.

As shown in FIGS. 23, 25, and 26, each of the recesses 522 has (a) a first end, shown as upper end 524, connected to the outer lip 512, (b) an opposing second end, shown as lower end 526, positioned beneath and radially inward relative to the upper end 524, and (c) one or more supporting or strengthening elements or portions, shown as braces 528, positioned along the underside of each of the recesses 522. In some embodiments, the bellows 510 does not include the braces 528 or the braces 528 may have different lengths or arrangements than shown (e.g., no center brace, no side braces, the center brace only extends along a portion of the recess 522, etc.). The upper end 524 is wider than the lower end 526 such that each of the recesses 522 has a tapered profile.

As shown in FIGS. 23-25, 34, and 35, each of the ridges 530 has a pair of sidewalls, shown as sidewalls 532, extending upward/outward from adjacent recesses 522, and an upper face, shown as slide face 534, extending between the sidewalls 532 and the outer lip 512. The sidewalls 532 and the slide face 534 terminate with an open end, shown as free end 536. The slide face 534 of each of the ridges 530 defines a first or outer aperture, shown as retainer aperture 538, and a second or inner aperture, shown as alignment aperture 540. In some embodiments (e.g., in embodiments where the bellows assembly 500 does not include the slide clips 550), the slide faces 534 do not define the retainer apertures 538 or the alignment apertures 540.

Figure 35:
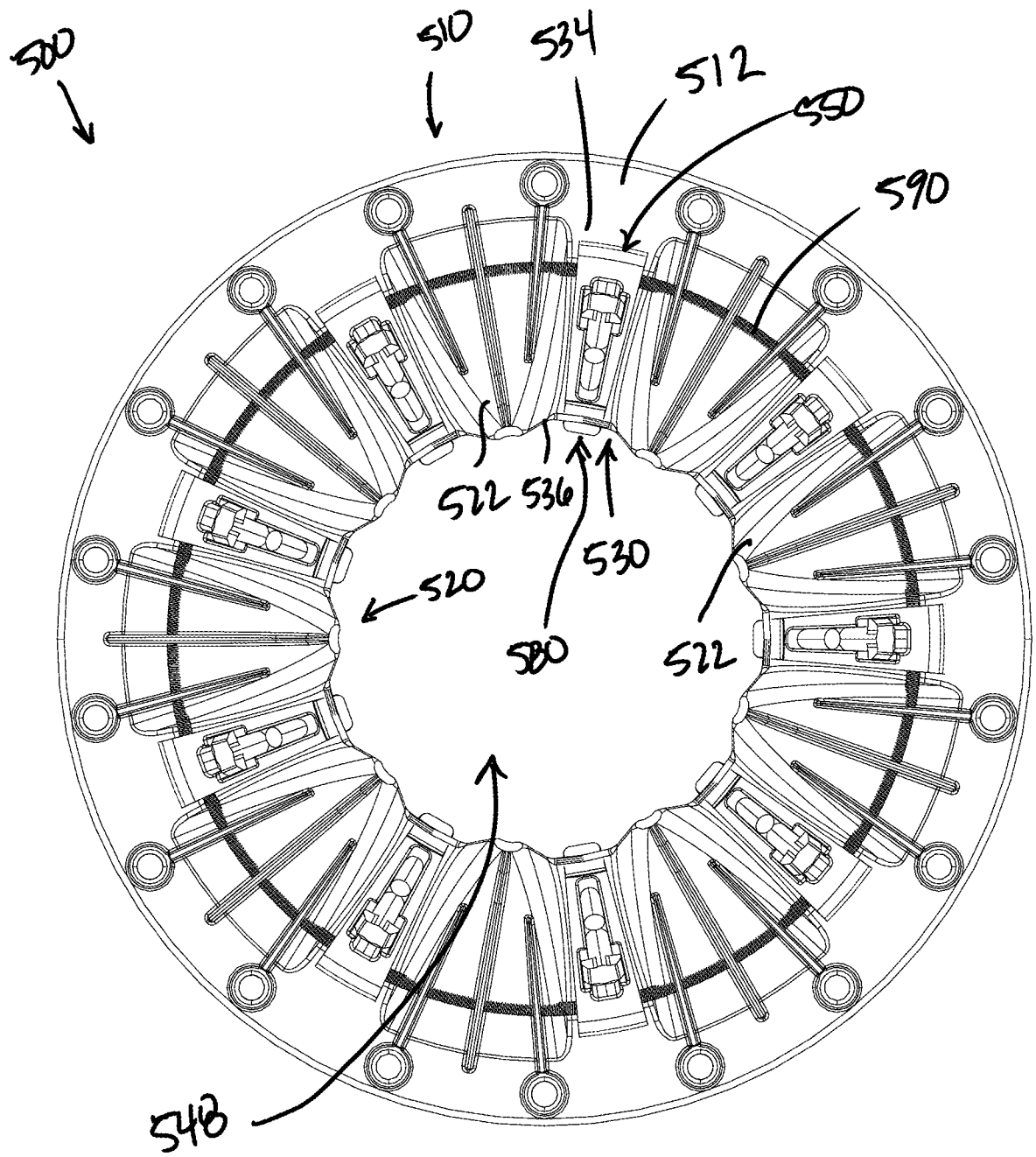
FIG. 35 is a bottom view of the bellows assembly of FIG. 23, according to an exemplary embodiment.

As shown in FIGS. 23, 25, and 35, the lower ends 526 of the recesses 522 and the free ends 536 of the ridges 530 of the flexible collar 520 define an opening, shown as beverage opening 548. According to an exemplary embodiment, the flexible collar 520 is configured to flex, expand, retract, or otherwise deform as the beverage opening 548 receives an object to facilitate accommodating variously sized containers or other items.

As shown in FIGS. 27-35, the slide clip 550 includes a main body portion, shown a clip body 552, and a second flap portion, shown as slide flap 570, pivotably coupled to the clip body 552, by a hinged or flexible edge, shown as clip hinge 580, extending between the front ends of the clip body 552 and the slide flap 570. As shown in FIGS. 27-34, the clip body 552 includes a housing, shown as clip housing 554, that defines (a) an interior chamber, shown as clip cavity 556, and (b) a pair of retaining interfaces, shown as retaining indents 558, along interior walls of the clip cavity 556. As shown in FIGS. 27-31, 33, and 34, the clip body 552 includes a spring retainer, shown as garter spring flange 560, extending rearward and curling upward from a rear end of the clip housing 554. The garter spring flange 560 defines a slot, shown as garter spring slot 562, and includes a protrusion, shown as garter spring retainer 564, extending from the garter spring flange 560 towards the rear end of the clip body 552 and at least partially across the garter spring slot 562.

Figure 33:
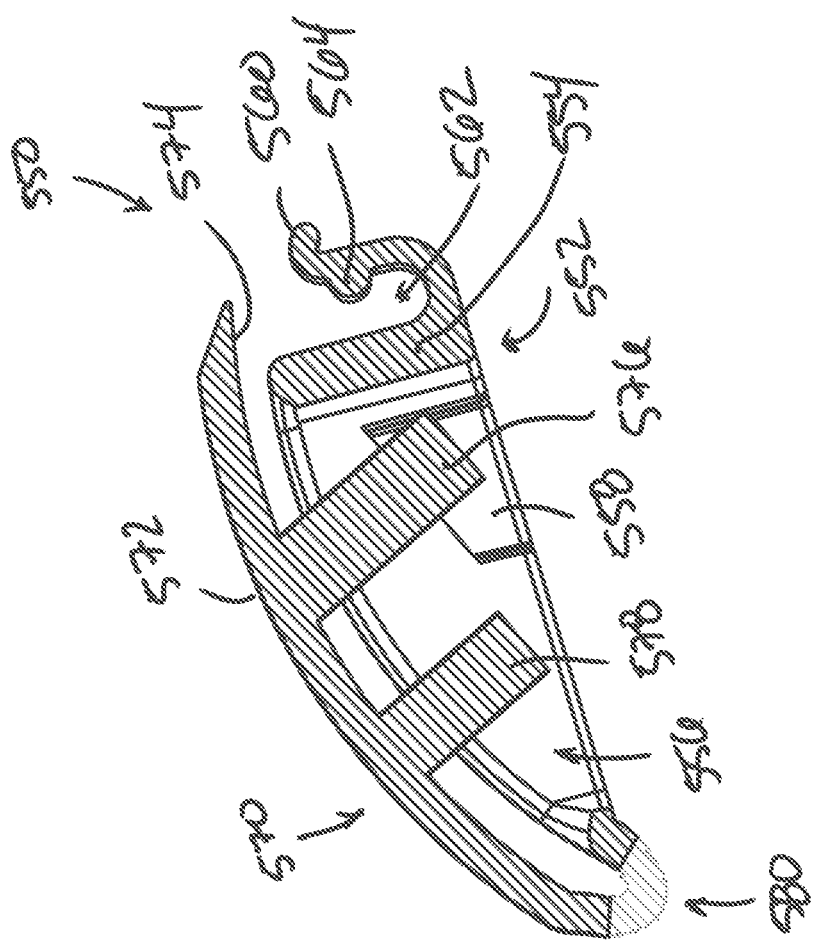
FIG. 33 is a cross-sectional view of the clip of FIG. 32, according to an exemplary embodiment.
Figure 32:
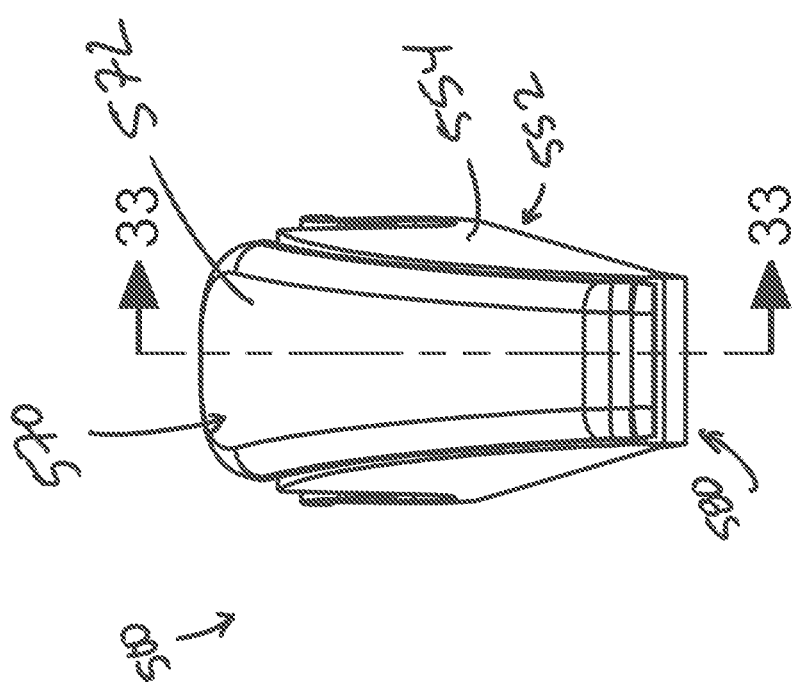
FIG. 32 is a front view of the clip of FIG. 27, according to an exemplary embodiment.
Figure 34:
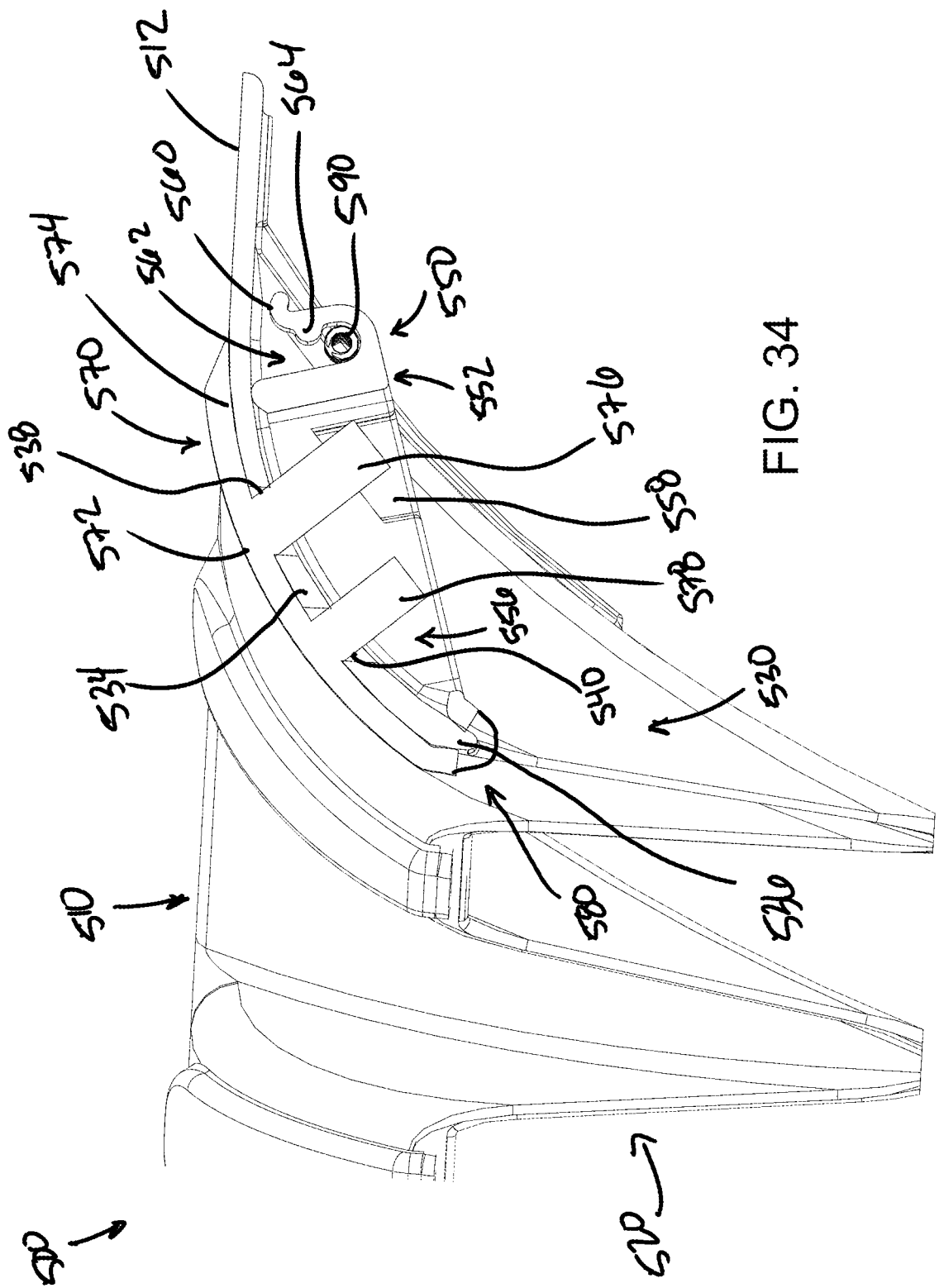
FIG. 34 is a partial cross-sectional view of the bellows assembly of FIG. 23, according to an exemplary embodiment.

As shown in FIGS. 27-34, the slide flap 570 has a first surface, shown as exterior surface 572, and an opposing second surface, shown as interior surface 574. As shown in FIGS. 27, 30, 31, 33, and 34, the slide flap 570 includes (a) one or more first protrusions, shown as slide pad retainers 576, and (b) a second protrusion, shown as alignment pin 578, extending from the interior surface 574. The slide flap 570 is pivotable relative to the clip body 552 about the clip hinge 580 between a first position or open orientation (as shown in FIGS. 27 and 29-31) and a second position or closed orientation (as shown in FIGS. 28 and 32-35). As shown in FIGS. 33 and 34, the slide pad retainers 576 and the alignment pin 578 extend into the clip cavity 556, and the slide pad retainers 576 engage with the retaining indents 558 to secure the slide flap 570 to the clip body 552 in the closed orientation.

As shown in FIGS. 23, 34, and 35, each of the slide clips 550 engages with and couple to the bellows 510. More specifically, as shown in FIGS. 34 and 35, (a) the clip body 552 is positioned along an underside of a respective one of the ridges 530 opposite the slide face 534, (b) the clip hinge 580 engages with the free end 536 of the respective one of the ridges 530, (c) the interior surface 574 of the slide flap 570 engages with the slide face 534 of the respective one of the ridges 530, (d) the slide pad retainers 576 of the slide flap 570 extend through the retainer aperture 538 of the respective one of the ridges 530 and engage with the retaining indents 558, and (e) the alignment pin 578 of the slide flap 570 extends through the alignment aperture 540 of the respective one of the ridges 530, which thereby secures the slide clip 550 to the bellows 510. As shown in FIGS. 34 and 35, the garter spring 590 engages with the garter spring flanges 560 of the slide clips 550 such that the garter spring 590 is received within the garter spring slots 562 and secured therein by the garter spring retainers 564.

As shown in FIGS. 5 and 6, the outer lip 512 of the bellows 510 engages with the sidewall 102 of the frame 100 such that the upper annular snap pins 114 of the frame 100 extend through the pin apertures 518 of the outer lip 512 to couple the bellow 510 and, therefore, the bellows assembly 500 to the frame 100. According to an exemplary embodiment, the exterior surfaces 572 of the slide flaps 570 are configured to permit the sliding of an object through the beverage opening 548 and into the beverage cavity 110 of the frame 100, while the material properties of the bellows 510 (e.g., elasticity, elastic deformation, retention properties, etc.) and the spring force of the garter spring 590 provide a retention or squeezing force against the object to securely hold the object within the beverage cavity 110. In some embodiments, the bellows assembly 500 does not include the slide clips 550 and the garter spring 590 such that the object engages directly with the slide faces 534 of the ridges 530 of the bellows 510. In such embodiments, (a) the slide faces 534 may be textured and/or have certain surface characteristics (e.g., to reduce overall amount of friction) and (b) the bellows 510 may have certain material properties (e.g., elasticity, elastic deformation, retention properties, that provide a similar retention force as the garter spring 590, etc.) that permit sliding of the object through the beverage opening 548 of the bellows 510, while still providing sufficient holding resistance to securely hold the object within the beverage cavity 110. In some embodiments, the bellows assembly 500 includes the slide clips 550, but does not include the garter spring 590.

While the bellows assembly 500 has been described herein as being used in the beverage holder 10, the bellows assembly 500 and/or the bellows 510 by itself may be used in other applications. For example, the bellows assembly 500 and/or the bellows 510 may be used with holders used in manufacturing, supply chain, robotics, or automation applications, or inserted into existing cup holders (e.g., in a vehicle, of a boat, a retrofit solution, etc.).

Figure 36:
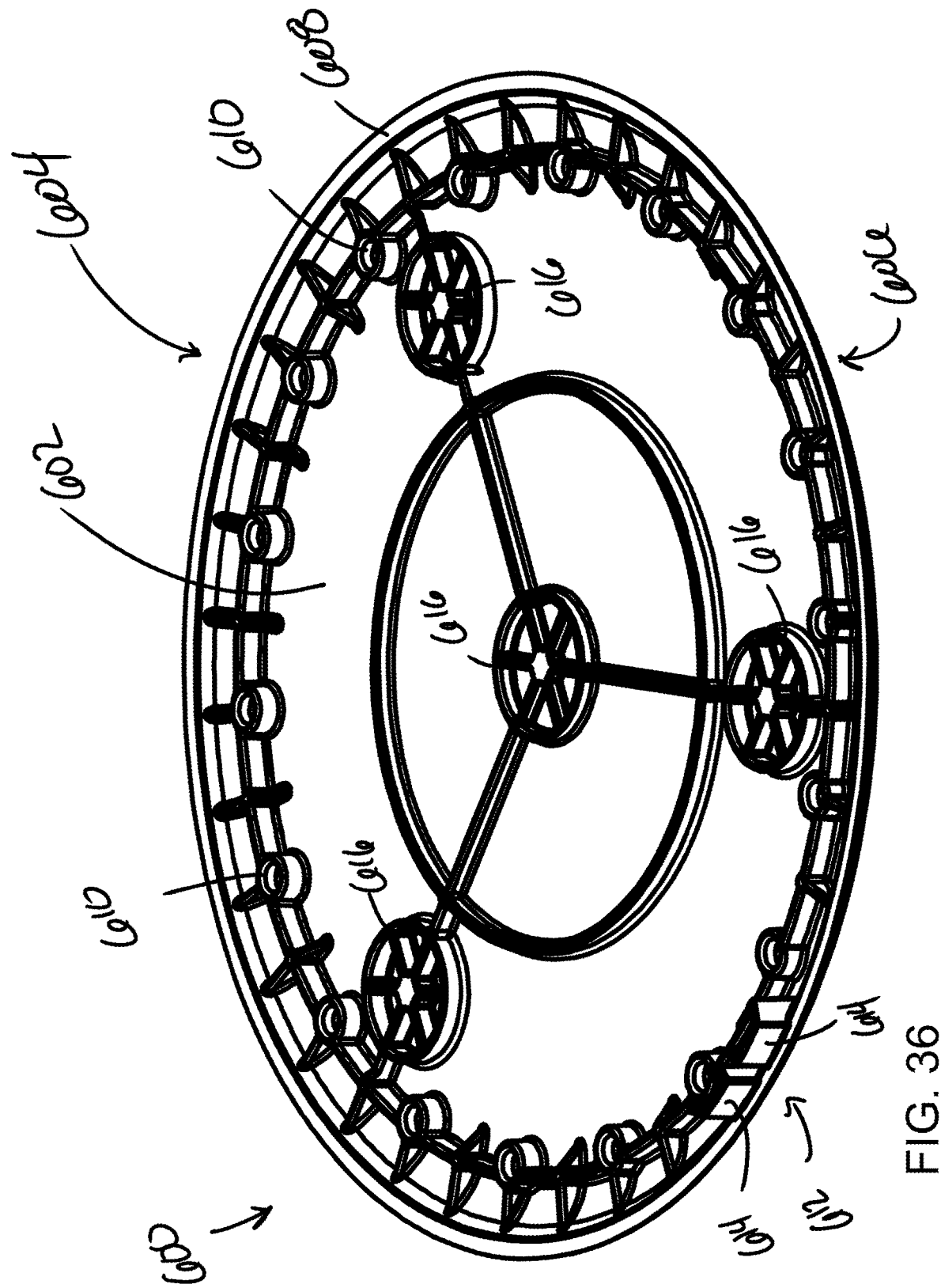
FIG. 36 is a perspective view of a base of the beverage holder of FIG. 1, according to an exemplary embodiment.
Figure 37:
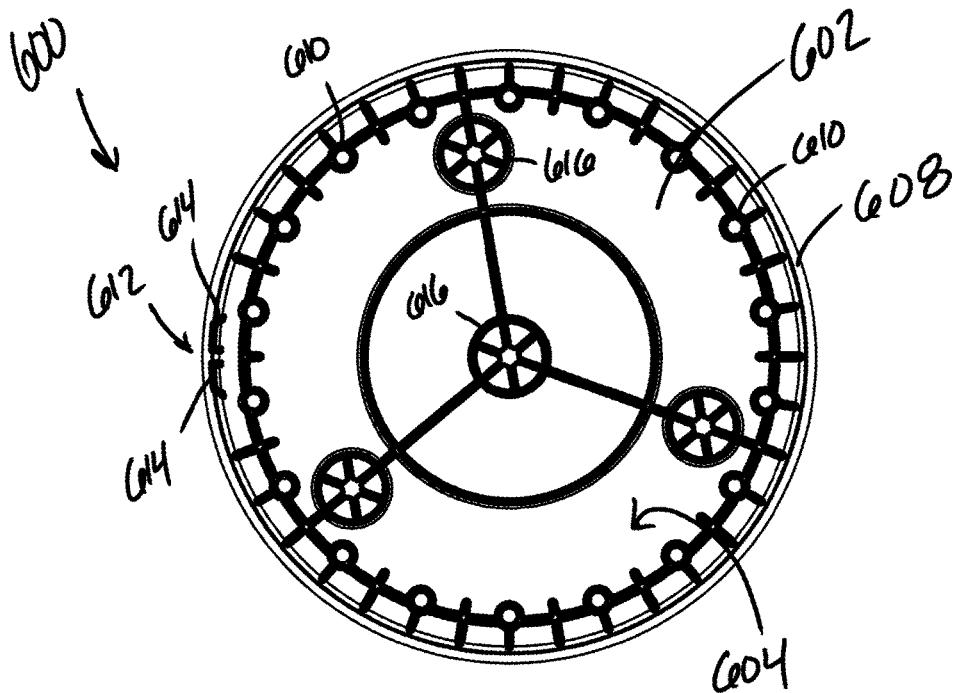
FIG. 37 is a top view of the base of FIG. 36, according to an exemplary embodiment.
Figure 38:
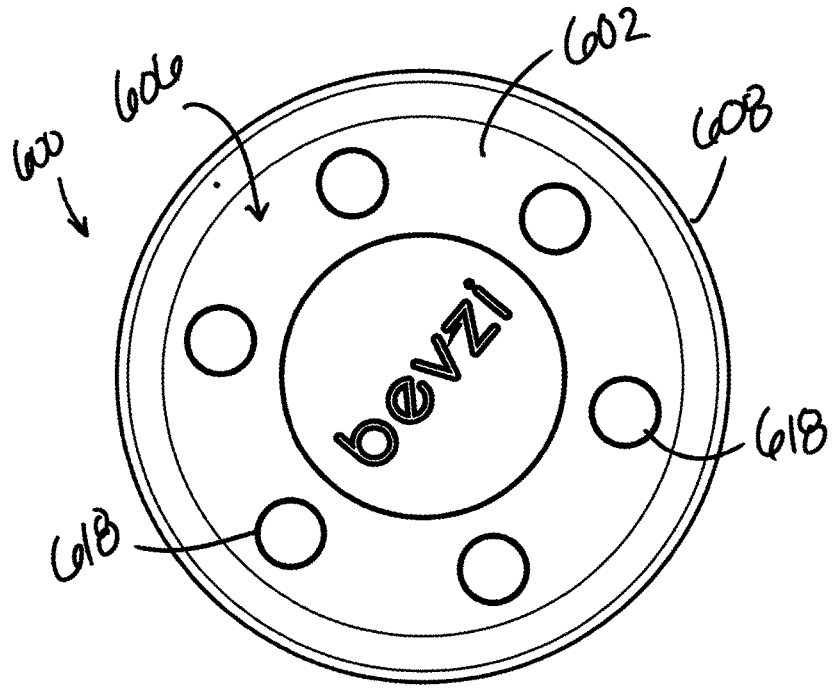
FIG. 38 is a bottom view of the base of FIG. 36, according to an exemplary embodiment.
Figure 39:
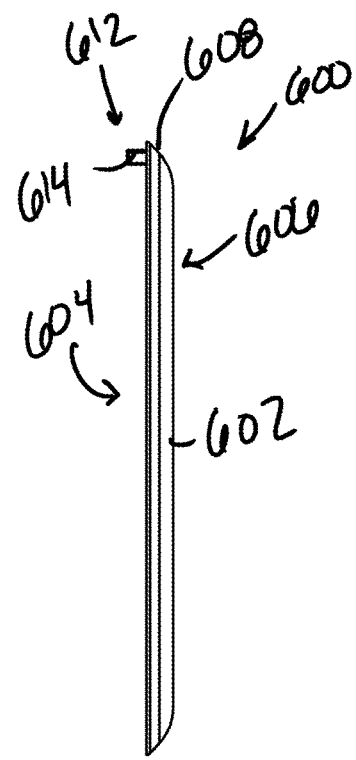
FIG. 39 is a side view of the base of FIG. 36, according to an exemplary embodiment.

As shown in FIGS. 36-39, the base plate 600 includes (a) a body, shown as bottom wall 602, having a first side, shown as upper side 604, and an opposing second side, shown as bottom side 606, and (b) a peripheral edge, shown as lip 608, extending upward from the upper side 604 and around the periphery of the bottom wall 602. As shown in FIGS. 36 and 37, the base plate 600 includes a first plurality of interfaces, shown as lower pin recesses 610, positioned inside of the lip 608 and extending upward from the upper side 604 and around the periphery of the bottom wall 602. As shown in FIGS. 36, 37, and 39, the base plate 600 includes a second interface, shown as base alignment interface 612, including a pair of protrusions, shown as base alignment tabs 614, extending upward from the upper side 604 of the bottom wall 602 and positioned between the lip 608 and the lower pin recesses 610. As shown in FIGS. 36 and 37, the base plate 600 includes a third plurality of interfaces, shown as spacer holders 616, positioned variously about and extending upward from the upper side 604 of the bottom wall 602, and positioned inside of the lower pin recesses 610. As shown in FIG. 38, the base plate 600 includes a fourth plurality of interfaces, shown as feet holders 618, positioned variously about and recessed into the bottom side 606 of the bottom wall 602.

Figure 2:
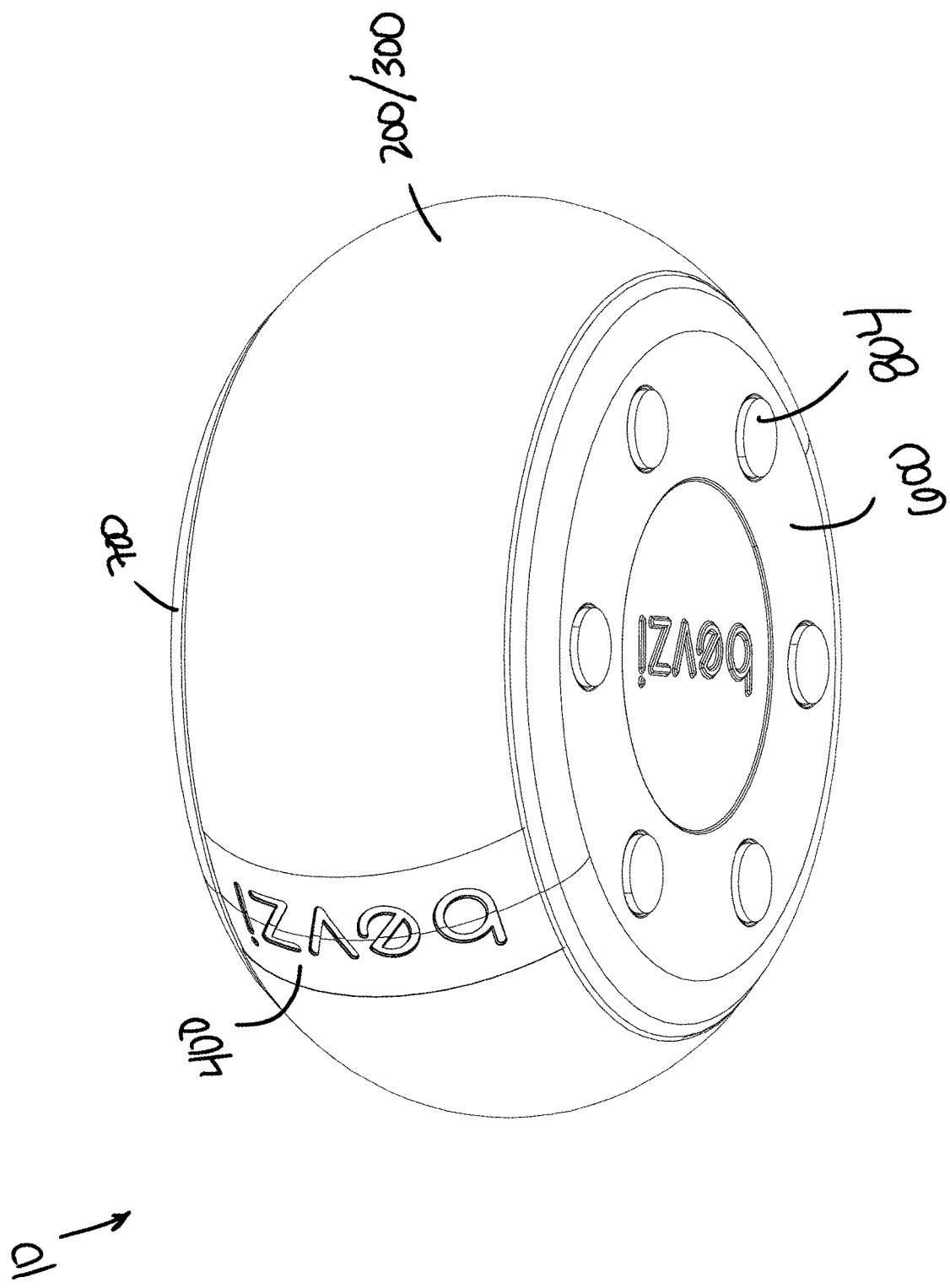
FIG. 2 is a bottom perspective view of the beverage holder of FIG. 1, according to an exemplary embodiment.
Figure 3:
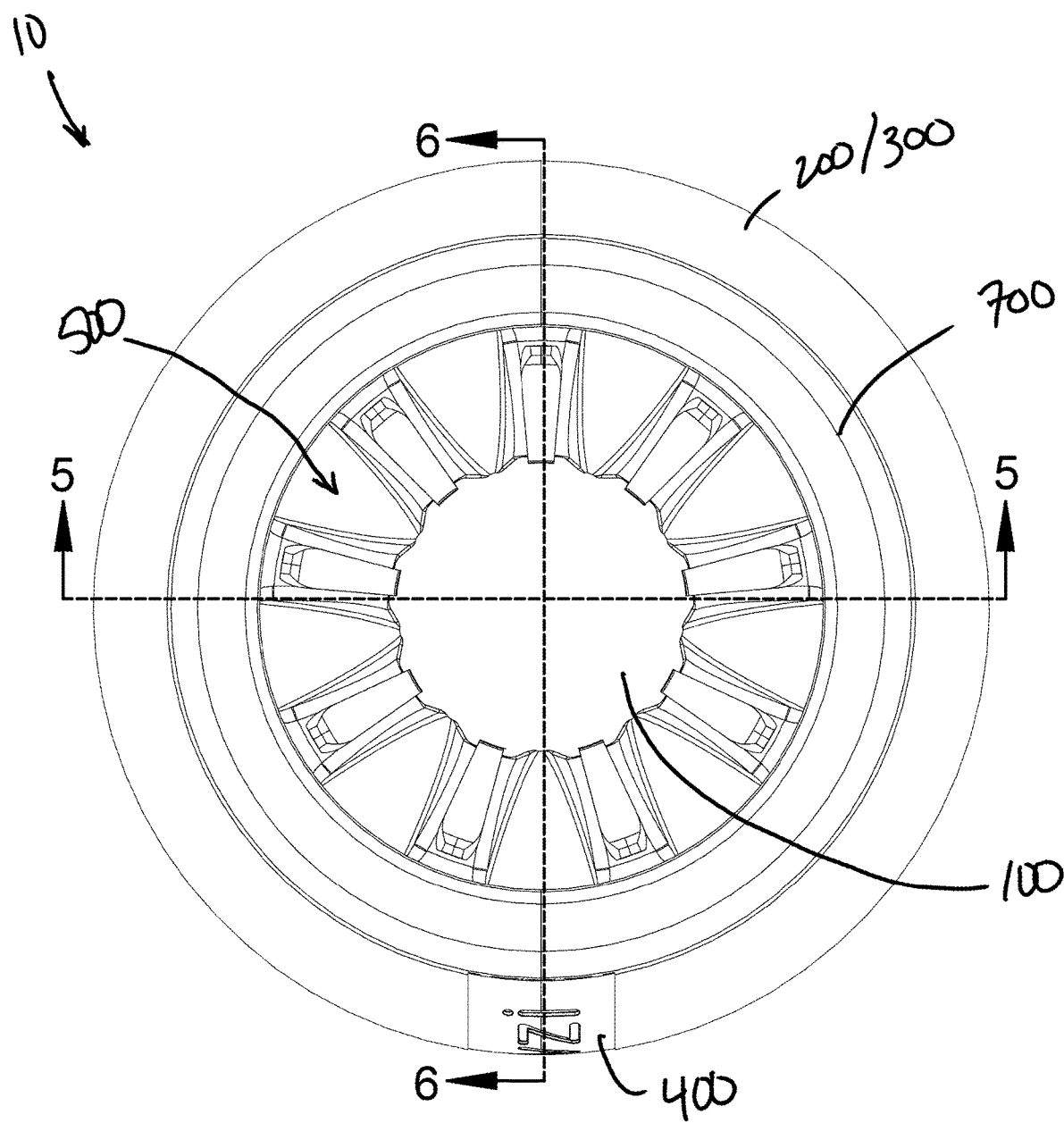
FIG. 3 is a top view of the beverage holder of FIG. 1, according to an exemplary embodiment.
Figure 4:
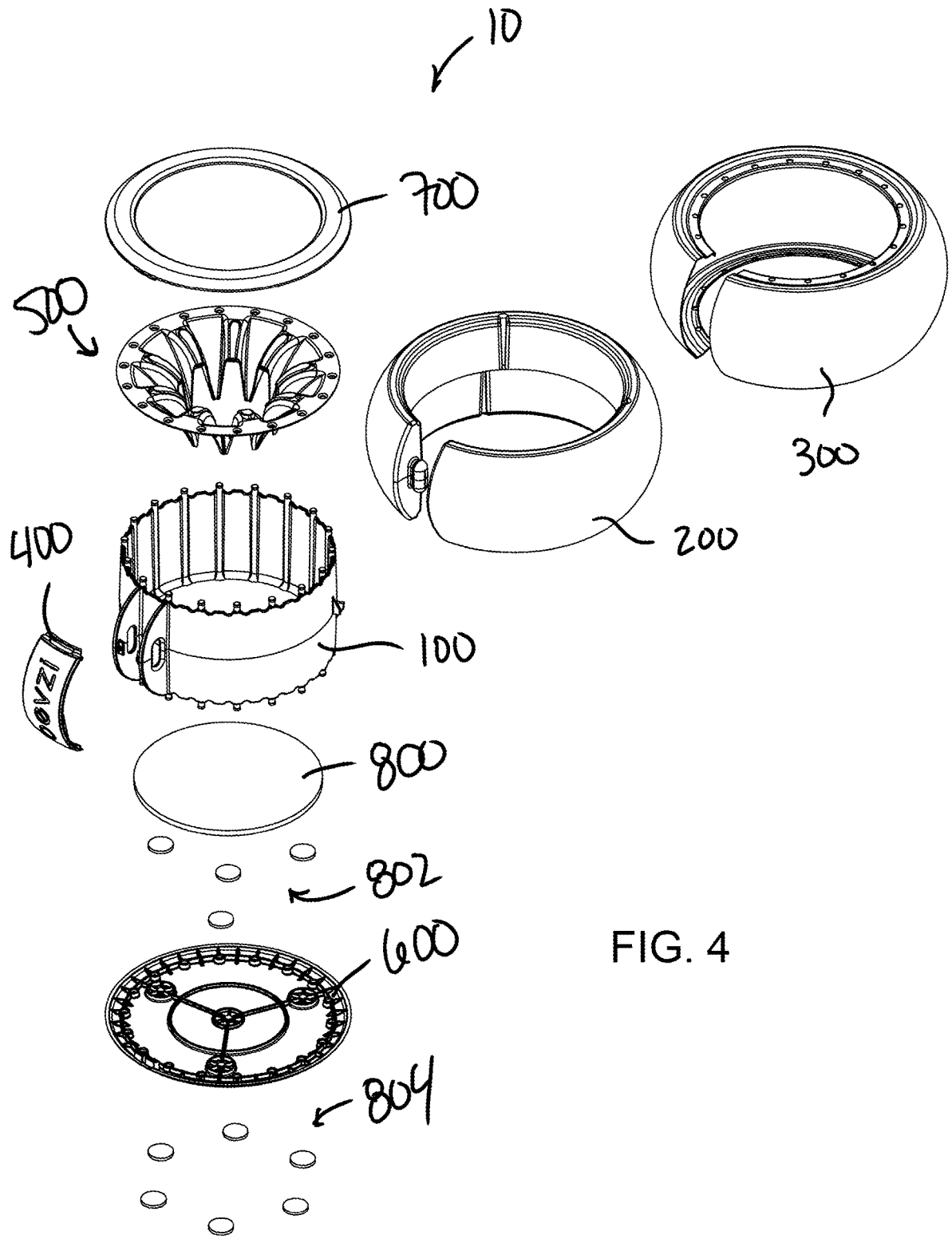
FIG. 4 is an exploded view of the beverage holder of FIG. 1, according to an exemplary embodiment.
Figure 48:
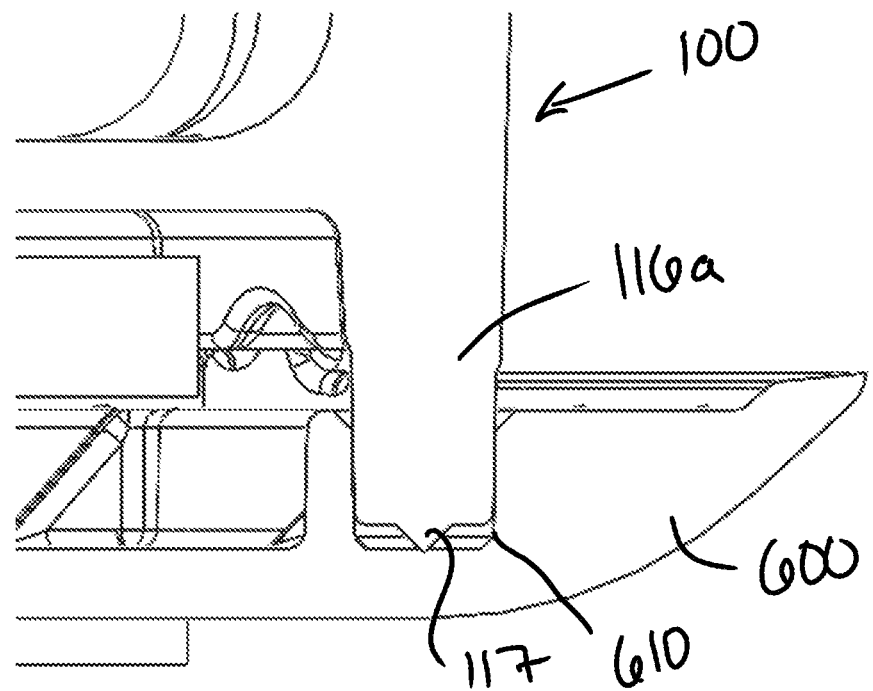

As shown in FIGS. 5 and 6, the base plate 600 couples to the lower end 106 of the sidewall 102 of the frame 100. More specifically, as shown in FIG. 5, the lower pin recesses 610 of the base plate 600 engage with and receive the lower annular snap pins 116 of the frame 100 to releasably couple the base plate 600 to the lower end 106 of the frame 100. In some embodiments, the lower annular snap pins 116 are press-fit into the lower pin recesses 610. In some embodiments, the lower annular snap pins 116 are additionally or alternatively ultrasonically welded within the lower pin recess 610. For example, as shown in FIG. 48, the lower annular snap pins 116 are replaced with lower annular pins 116a. The lower annular pins 116a include an ultrasonic energy director, shown as director nub 117, that protrudes therefrom. During manufacture and assembly, the lower annular pins 116a are received by the lower pin recesses 610 of the base plate 600 and the director nubs 117 engage with the lowermost surface of the lower pin recesses 610 such that a small gap is present between the lowermost surface of the lower pin recesses 610 and the bottom surface of the lower annular pins 116a (from which the director nubs 117 extend). With the base plate 600 engaged with the frame 100, an ultrasonic welding machine may then be used to apply ultrasonic energy or waves thereto, which causes the director nubs 117 to melt, deform, etc. to fill the small gaps and form a secure connection between the base plate 600 and the frame 100. In some embodiments, the lower annular snap pins 116 or the lower annular pins 116a are additionally or alternatively adhesively secured (e.g., glued) within the lower pin recesses 610. As shown in FIG. 6, the base plate 600 couples to the end cap 400. More specifically, the base alignment interface 612 of the base plate 600 engages with the lower flange 430 of the end cap 400 such that the base alignment tabs 614 of the base alignment interface 612 extend through the lower retaining apertures 432 of the lower flange 430. As shown in FIGS. 5 and 6, the inner spacer pads 802 interface with the spacer holders 616 and the counterweight 800 is disposed within the counterweight chamber 112 of the frame 100 between the bottom 108 of the frame 100 and the inner spacer pads 802. The inner spacer pads 802 may be manufactured from a resilient or compliant material (e.g., rubber, felt pads, etc.). In some embodiments, the beverage holder 10 does not include the inner spacer pads 802. According to an exemplary embodiment, the counterweight 800 is sufficiently heavy (e.g., 170 grams, ⅓ of a pound, etc.) so as to increase stability and tipping resistance of the beverage holder 10 to substantially prevent tipping of the beverage holder 10 during normal or standard use (e.g., by lowering the center of gravity of the beverage holder 10). The counterweight 800 may be manufactured from steel or another suitable, heavy material. As shown in FIGS. 2, 5, and 6, the outer foot pads 804 are coupled to the bottom side 606 of the base plate 600 and disposed within the feet holders 618 thereof. The outer foot pads 804 may be manufactured from a resilient or compliant material (e.g., rubber, felt pads, to provide anti-slide or anti-skid properties, etc.).

Figure 40:
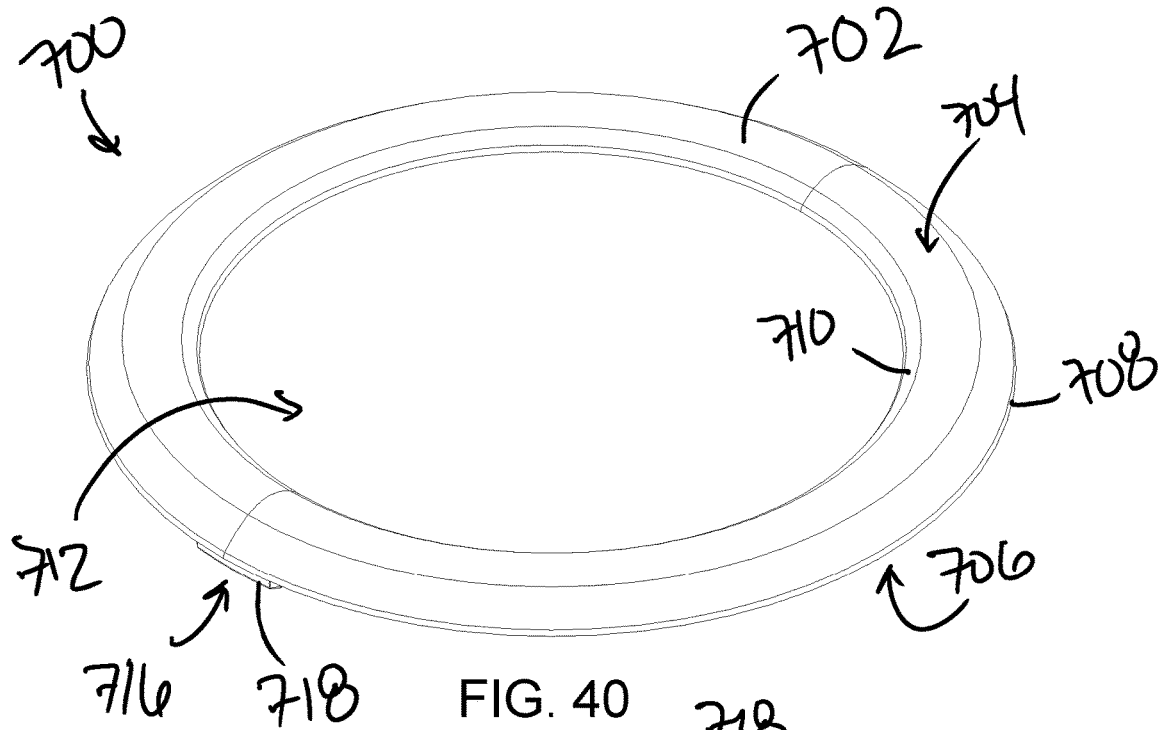
FIG. 40 is a perspective view of a top ring of the beverage holder of FIG. 1, according to an exemplary embodiment.
Figure 41:
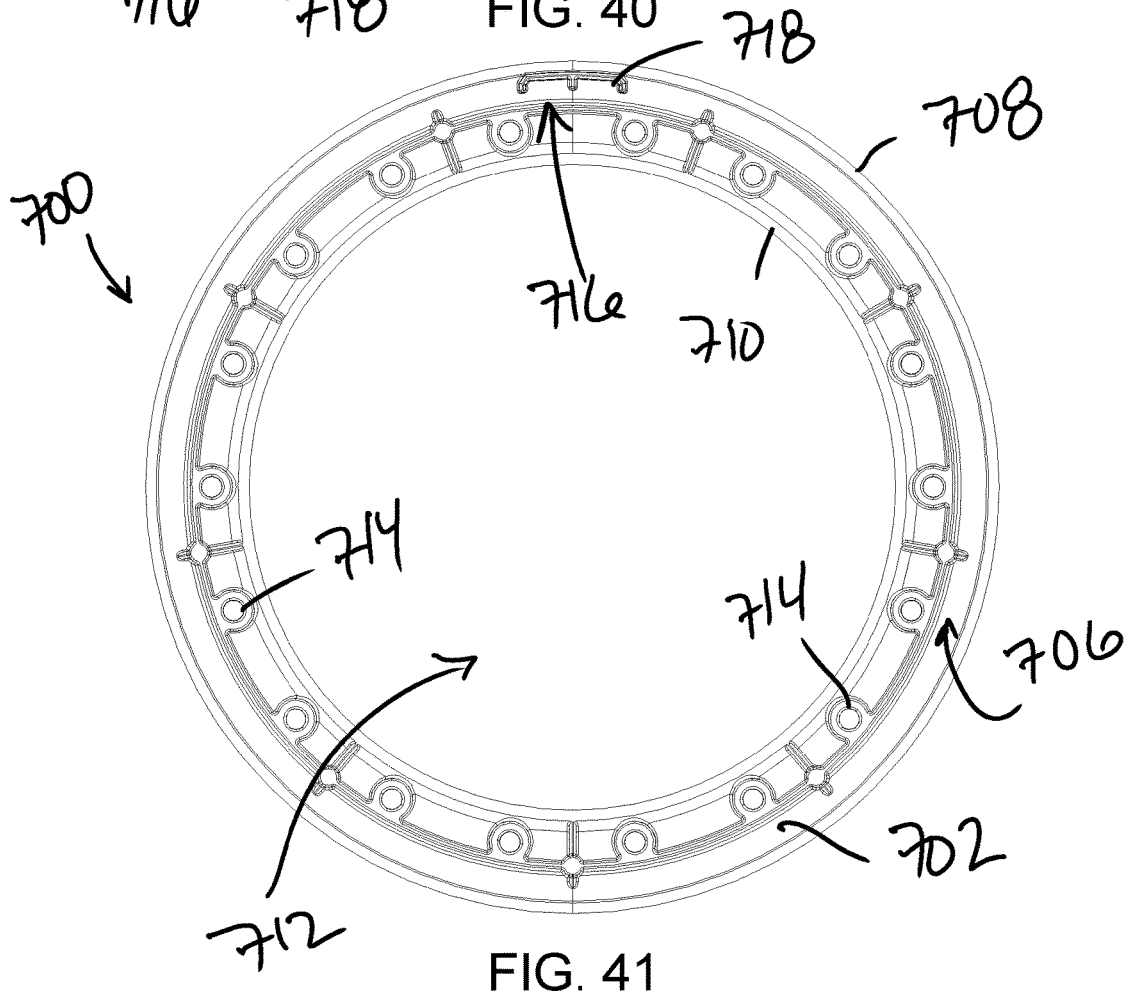
FIG. 41 is a bottom view of the top ring of FIG. 40, according to an exemplary embodiment.
Figure 42:
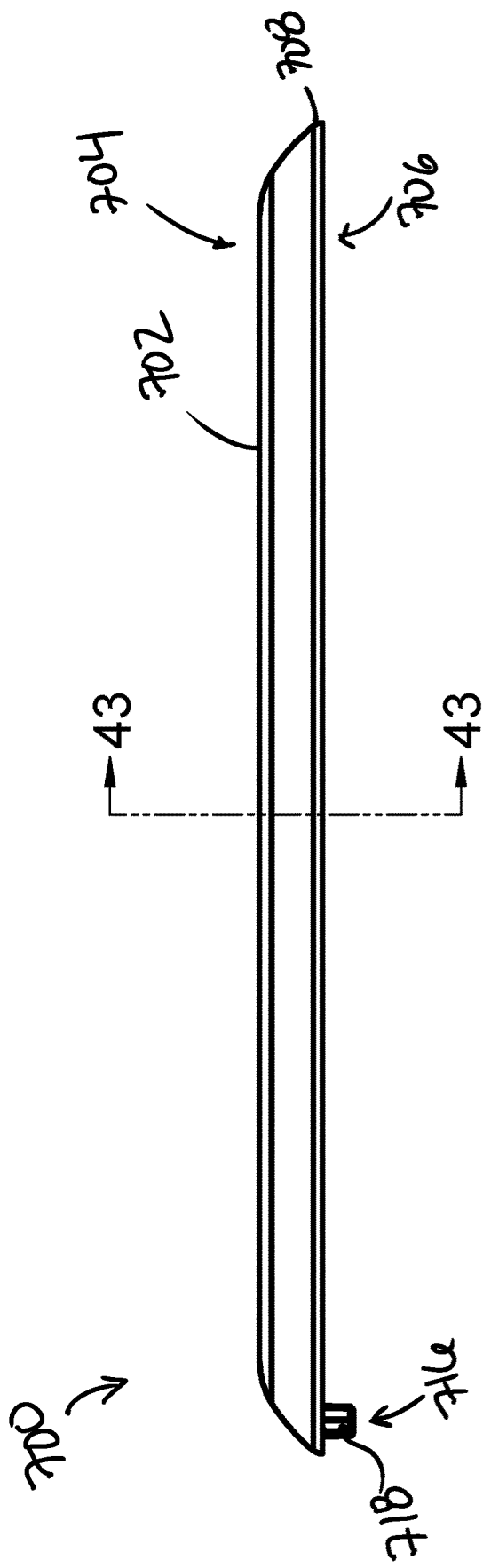
FIG. 42 is a side view of the top ring of FIG. 40, according to an exemplary embodiment.
Figure 43:
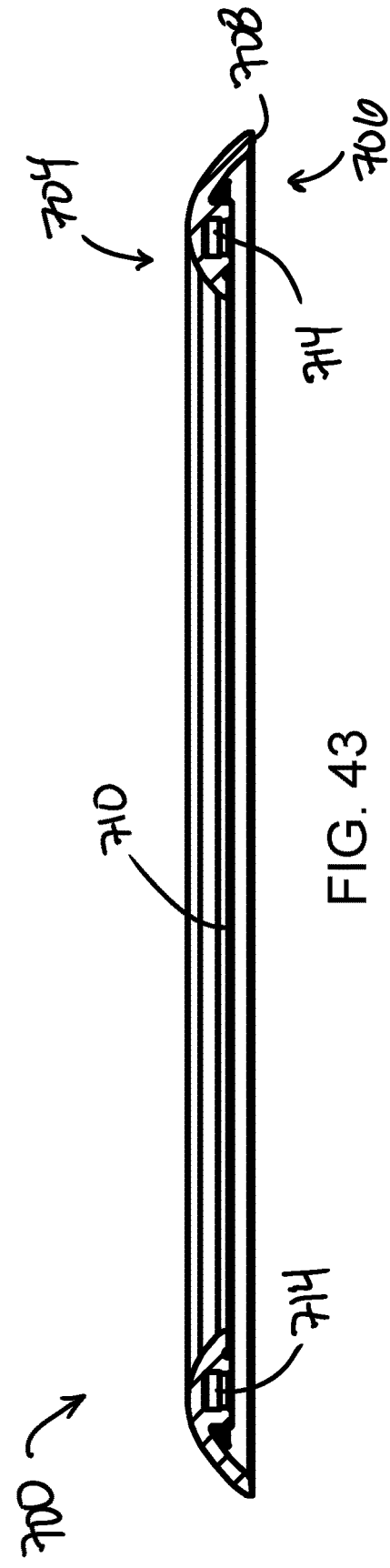
FIG. 43 is a cross-sectional view of the top ring of FIG. 42, according to an exemplary embodiment.

As shown in FIGS. 40-43, the top ring 700 includes (a) a body, shown as curved cap 702, having a first side, shown as upper side 704, and an opposing second side, shown as bottom side 706, (b) a first peripheral edge, shown as outer lip 708, extending downward from the bottom side 706 and around an outer periphery of the curved cap 702, and (c) a second peripheral edge, shown as inner lip 710, extending downward from the bottom side 706 and around an inner periphery of the curved cap 702. As shown in FIGS. 40 and 41, the inner lip 710 defines an aperture, shown as ring aperture 712 (which aligns with the beverage cavity 110 and the beverage opening 548). As shown in FIGS. 41 and 43, the top ring 700 includes a first plurality of interfaces, shown as upper pin recesses 714, positioned between the inner lip 710 and the outer lip 708, extending downward from the bottom side 706, and extending around the periphery of the curved cap 702. As shown in FIGS. 40-42, the top ring 700 includes a second interface, shown as ring alignment interface 716, including a protrusion, shown as ring alignment tab 718, extending downward from the bottom side 706 of the curved cap 702 and positioned between the outer lip 708 and the upper pin recesses 714.

Figure 47:
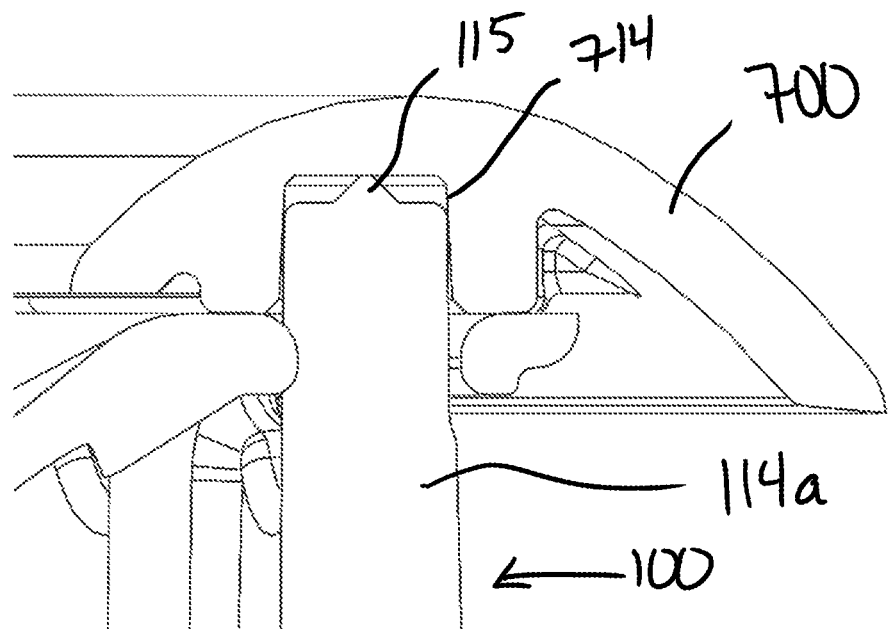
FIGS. 47 and 48 are cross-sectional views of the beverage holder of FIG. 1, according to another exemplary embodiment.

As shown in FIGS. 5 and 6, the top ring 700 couples to the upper end 104 of the sidewall 102 of the frame 100. More specifically, as shown in FIG. 5, the upper pin recesses 714 of the top ring 700 engage with and receive the upper annular snap pins 114 of the frame 100 to releasably couple the top ring 700 to the upper end 104 of the frame 100. In some embodiments, the upper annular snap pins 114 are press-fit into the upper pin recesses 714. In some embodiments, the upper annular snap pins 114 are additionally or alternatively ultrasonically welded within the upper pin recess 714. For example, as shown in FIG. 47, the upper annular snap pins 114 are replaced with upper annular pins 114a. The upper annular pins 114a include an ultrasonic energy director, shown as director nub 115, that protrudes therefrom. During manufacture and assembly, the upper annular pins 114a are received by the upper pin recesses 714 of the top ring 700 and the director nubs 115 engage with the uppermost surface of the upper pin recesses 714 such that a small gap is present between the uppermost surface of the upper pin recesses 714 and the top surface of the upper annular pins 114a (from which the director nubs 115 extend). With the top ring 700 engaged with the frame 100, an ultrasonic welding machine may then be used to apply ultrasonic energy or waves thereto, which causes the director nubs 115 to melt, deform, etc. to fill the small gaps and form a secure connection between the top ring 700 and the frame 100. In some embodiments, the upper annular snap pins 114 or the upper annular pins 114a are additionally or alternatively adhesively secured (e.g., glued) within the upper pin recesses 714. As shown in FIG. 6, the top ring 700 couples to the end cap 400. More specifically, the ring alignment interface 716 of the top ring 700 engages with the upper flange 420 of the end cap 400 such that the ring alignment tab 718 of the ring alignment interface 716 extend through the upper retaining aperture 422 of the upper flange 420.

According to an exemplary embodiment, the different structures of (i) the upper flange 420 and the ring alignment interface 716 and (ii) the lower flange 430 and the base alignment interface 612 facilitate proper assembly of the beverage holder 10 by preventing an assembler from swapping the base plate 600 and the top ring 700. However, in other embodiments, the upper flange 420 and the lower flange 430 are the same, and so are the ring alignment interface 716 and the base alignment interface 612. According to an exemplary embodiment, the beverage holder 10 provides a liquid tight assembly such that if liquid were spilled within the beverage cavity 110, liquid will not seep out onto the surface that the beverage holder 10 is situated. In such an instance, the beverage cavity 110 can be simply wiped clean, or the beverage holder 10 can be easily dissembled, cleaned, and reassembled.

Figure 44:
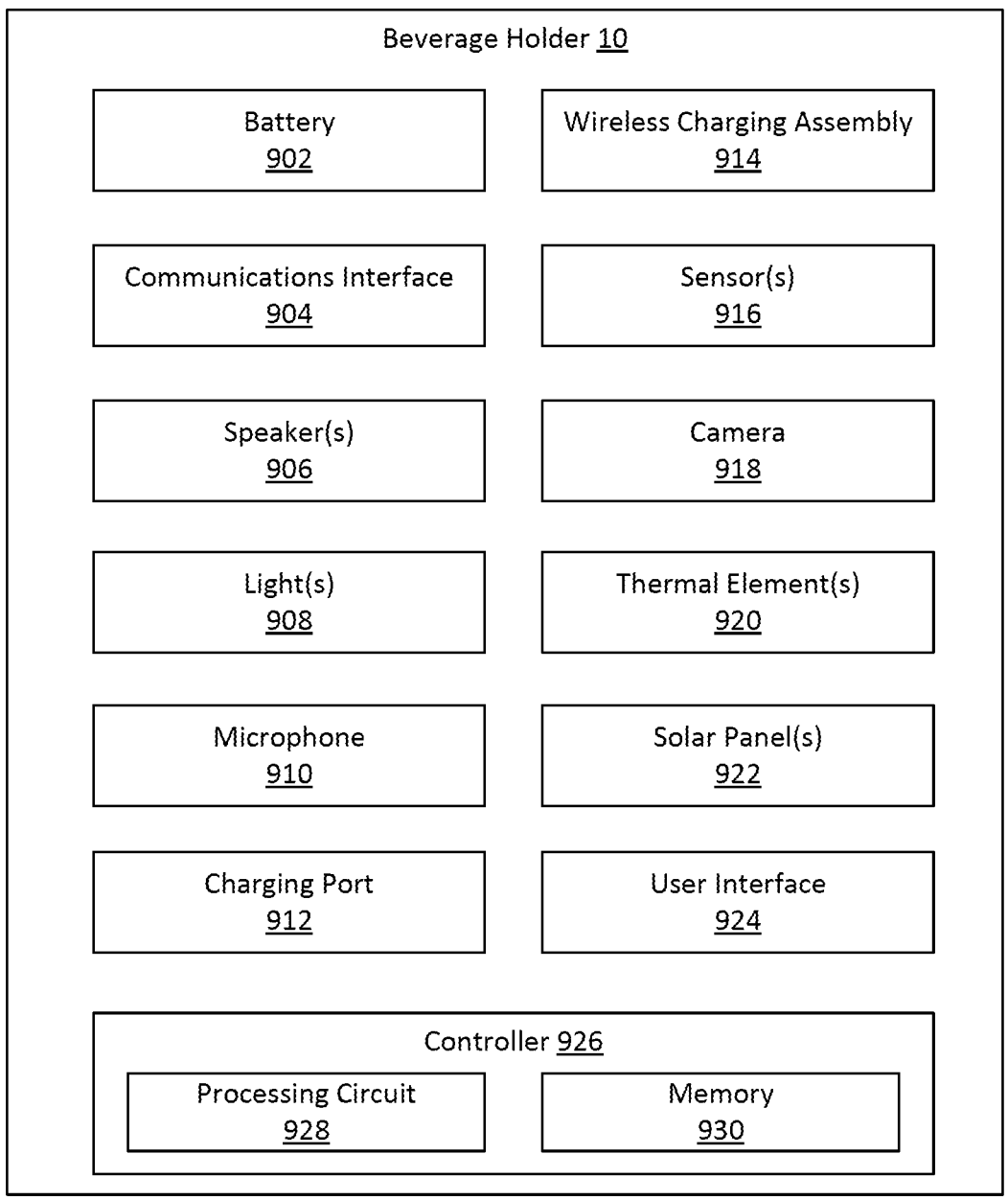
FIG. 44 is a schematic block diagram of the beverage holder of FIG. 1, according to an exemplary embodiment.

As shown in FIG. 44, the beverage holder 10 includes one or more additional features (e.g., technological features). These features can include a battery 902, a communications interface 904, one or more speakers 906, one or more lights 908, a microphone 910, a charging port 912, a wireless charging assembly 914, one or more sensors 916, a camera 918, one or more thermal elements 920, one or more solar panels 922, a user interface 924, and a controller 926. The battery 902 may be configured to facilitate portable operation of one or more electronic components of the beverage holder 10. The battery 902 may be replaceable and/or rechargeable (e.g., via the charging port 912, the wireless charging assembly 914, the solar panels 922, etc.). The communications interface 904 may be configured to facilitate wireless communication and/or wired communication with external systems (e.g., a local area network, a user device, an external control system such as a smart home system or connected speaker system, etc.). The one or more speakers 906 may be configured to output sound (e.g., music, digital assistant responses, alarms, etc.). The microphone 910 may be configured to facilitate acquiring voice commands and/or performing phone calls. The charging port 912 may be configured to facilitate charging the battery 902 via a wired connection. The wireless charging assembly 914 may be configured to facilitate charging the battery 902 via wireless charging. The one or more sensors 916 may include a temperature sensor, an activity/motion sensor, and/or still other sensors. The camera 918 may be configured to acquire image data (e.g., still images, video, to function like a baby or pet monitor, to function like a security or secret camera device, etc.). The one or more thermal elements 920 may include a heating element and/or a cooling element configured to thermally regulate the beverage cavity 110. The one or more solar panels 922 may be configured to facilitate charging the battery 902 and/or directly powering other electronic components of the beverage holder 10. The user interface 924 may include one or more inputs and/or output devices (e.g., buttons, dials, toggles, knobs, switches, displays, touchscreens, lights, LEDs, etc.) configured to receive user inputs (e.g., temperature settings, volume settings, etc.) and/or provide outputs to a user.

The controller 926 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 44, the controller 926 includes a processing circuit 928 and a memory 930. The processing circuit 928 may include an ASIC, one or more FPGAs, a DSP, circuits containing one or more processing components, circuitry for supporting a microprocessor, a group of processing components, or other suitable electronic processing components. In some embodiments, the processing circuit 928 is configured to execute computer code stored in the memory 930 to facilitate the activities described herein. The memory 930 may be any volatile or non-volatile computer-readable storage medium capable of storing data or computer code relating to the activities described herein. According to an exemplary embodiment, the memory 930 includes computer code modules (e.g., executable code, object code, source code, script code, machine code, etc.) configured for execution by the processing circuit 928.

The controller 926 may be configured to receive commands (e.g., wirelessly from a user device via the communications interface 904, via the user interface 924, via the microphone 910, etc.) to control one or more operations of the beverage holder 10 and/or components thereof. By way of example, the commands may be to turn the volume of the up, turn the volume down, turn off, turn on, skip song, play a certain song/playlist, look something up, check the weather, maintain a certain temperature of the beverage cavity 110, set a timer, make a reservation, create a task/shopping list, etc.). The controller 926 may be configured to provide a "smart" beverage holder with an intelligent digital assistant.

Figure 45:
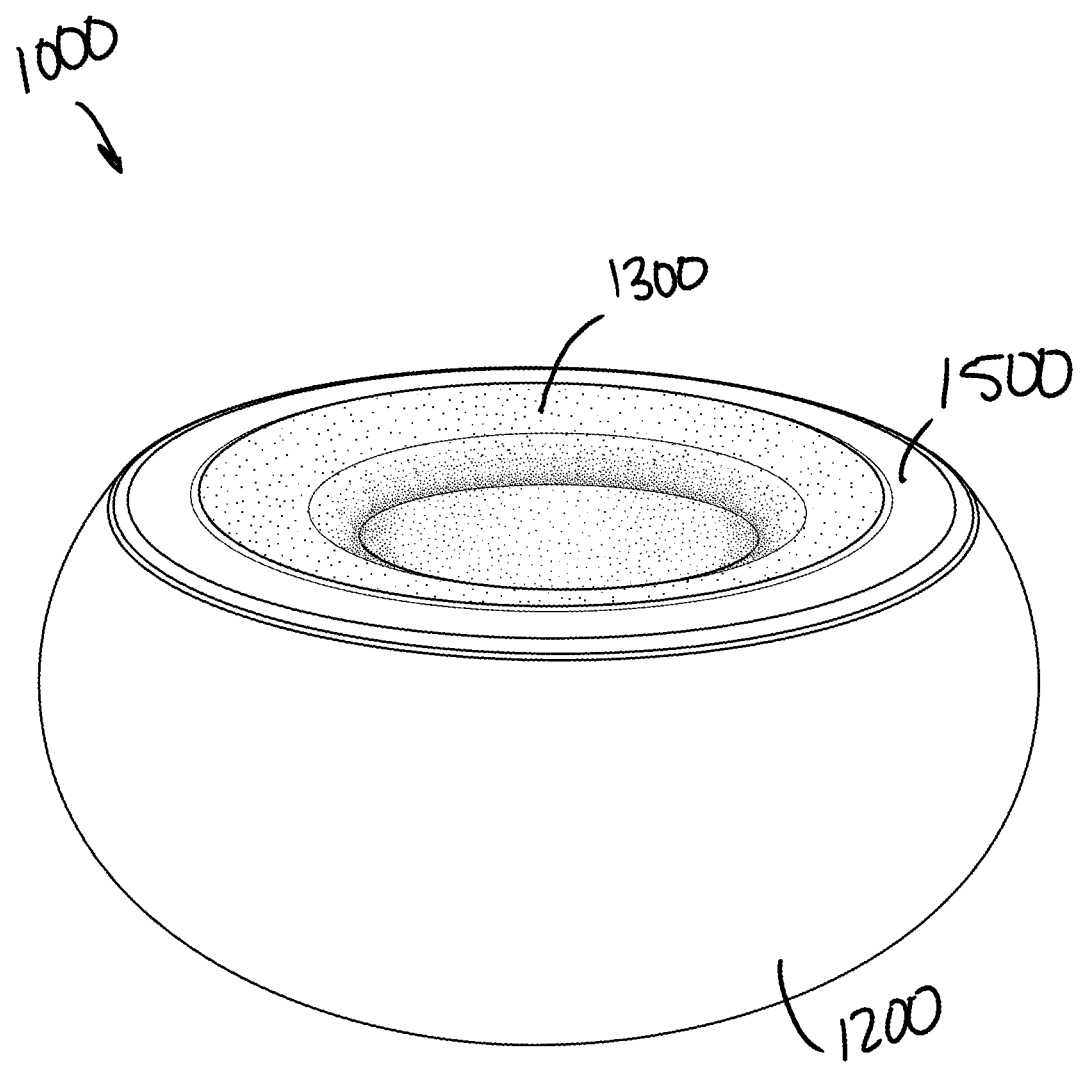
FIG. 45 is a perspective view of a beverage holder, according to another exemplary embodiment.
Figure 46:
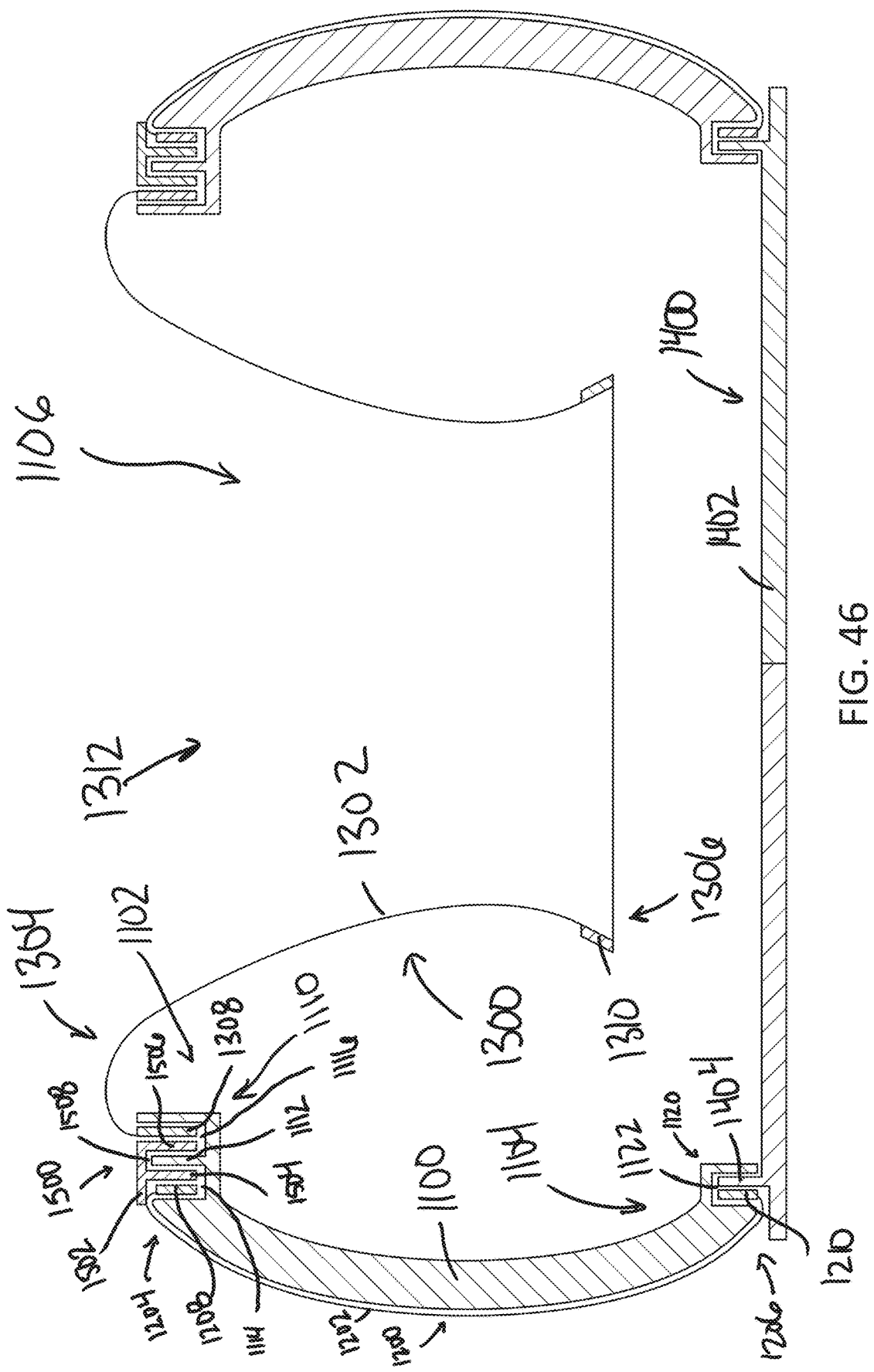
FIG. 46 is a cross-sectional view of the beverage holder of FIG. 45, according to an exemplary embodiment.

As shown in FIGS. 45 and 46, another container holder, shown as beverage holder 1000, includes a plurality of components or subassemblies including (a) a main structural component or main body, shown as body 1100, (b) a body covering, shown outer cover 1200, (c) a container insert or container retention assembly, shown as container retainer 1300, (d) a lower cover or base, shown as base 1400, and (e) an upper cover or ring, shown as top ring 1500. As shown in FIG. 46, the body 1100 has a first end, shown upper end 1102, and an opposing second end, shown as lower end 1104. The interior of the body 1100 defines a through-hole or passage, shown as beverage cavity 1106. According to an exemplary embodiment, the body 1100 functions as a structure or frame-like component of the beverage holder 1000. According to the exemplary embodiment shown, the exterior of body 1100 has an arcuate shape such that the body 1100 has a toroidal-like shape or structure. In other embodiments, the body 1100 has another shape or structure (e.g., cube-like, sphere-like, cylinder-like, hemisphere-like, etc.).

As shown in FIG. 46, the upper end 1102 of the body 1100 includes a first flange, shown as upper flange 1110, that extends around the periphery of the upper end 1102. The upper flange 1110 includes a dividing rib, shown as base rib 1112, positioned therealong that divides the upper flange 1110 into two sections or inner and outer portions that define peripheral channels, shown as outer channel 1114 and inner channel 1116. The lower end 1104 of the body 1100 includes a second flange, shown as lower flange 1120, that extends around the periphery of the lower end 1104. The lower flange 1120 defines a peripheral channel, shown as lower channel 1122. In other embodiments, the upper flange 1110 and the lower flange 1120 have the same structure, rather than the different structures shown.

As shown in FIG. 46, the outer cover 1200 includes a layer of material, shown as fabric layer 1202, having a first end, shown upper end 1204, an opposing second end, shown as lower end 1206. The upper end 1204 and the lower end 1206 include retaining elements or retainers (e.g., a plastic strip, an elastic strip, etc.), shown as upper retainer 1208 and lower retainer 1210, coupled or secured thereto and therealong. In some embodiments, the outer cover 1200 does not include the upper retainer 1208 and/or the lower retainer 1210. As shown in FIG. 46, (i) the upper retainer 1208 of the outer cover 1200 is received by the outer channel 1114 of the upper flange 1110 of the body 1100 and (ii) the lower retainer 1210 of the outer cover 1200 is received by the lower channel 1122 of the lower flange 1120 of the body 1100 such that the fabric layer 1202 is disposed along an exterior of the body 1100. The fabric layer 1202 may be stretchable to provide a tight fit around the exterior of the body 1100 and conform to the shape thereof.

As shown in FIG. 46, the container retainer 1300 includes a layer of material, shown as fabric layer 1302, having a first end, shown upper end 1304, and an opposing second end, shown as lower end 1306. The upper end 1304 and the lower end 1306 include retaining elements or retainers (e.g., a plastic strip, an elastic strip, etc.), shown as upper retainer 1308 and lower retainer 1310, coupled or secured thereto and therealong. In some embodiments, the container retainer 1300 does not include the upper retainer 1308 and/or the lower retainer 1310. As shown in FIG. 46, (i) the upper retainer 1308 of the container retainer 1300 is received by the inner channel 1116 of the upper flange 1110 of the body 1100 and (ii) the lower retainer 1310 of the container retainer 1300 hangs freely within the beverage cavity 1106 of the body 1100 such that the fabric layer 1302 extends into the beverage cavity 1106. In other embodiments, the lower retainer 1310 of the container retainer 1300 is received by the lower channel 1122 of the lower flange 1120 of the body 1100. The fabric layer 1302 and the lower retainer 1310 may be stretchable or elastic to conform to and provide a tight fit around an object (e.g., a beverage container, etc.) received by a passage, shown as beverage passage 1312, defined by the container retainer 1300 to secure the object within the beverage cavity 1106. According to an exemplary embodiment, the lower end 1306 has a smaller, natural diameter (e.g., when not expanded) that the diameter of the upper end 1304 such that the container retainer 1300 has a natural tapered or funnel shape.

As shown in FIG. 46, the base 1400 includes a bottom support, shown as support plate 1402, with a protrusion, shown as base rib 1404, extending around and proximate the periphery thereof. The base rib 1404 is offset from the edge of the support plate 1402 such that the support plate 1402 extends laterally outward past the base rib 1404. The base rib 1404 is received by the lower channel 1122 of the lower flange 1120 of the body 1100 to press fit therein and secure the lower retainer 1210 at the lower end 1206 of the outer cover 1200 (and, in some embodiments, the lower retainer 1310 at the lower end 1306 of the container retainer 1300) within the lower channel 1122. The base rib 1404 (and the base 1400 as a whole) may be manufactured from a compliant, rubber/elastic material that compresses and forms a tight seal within the lower channel 1122. In some embodiments (e.g., embodiments where the lower flange 1120 has the same structure as the upper flange 1110), the base 1400 is similar to the top ring 1300, and the lower retainer 1210 and the lower retainer 1310 are secured to the lower flange 1120 by the base 1400 similar to how the upper retainer 1208 and the upper retainer 1308 are secured to the upper flange 1110 by the top ring 1500, as described in more detail herein.

As shown in FIG. 46, the top ring 1500 includes a top plate, shown as cap 1502, with a pair of protrusions extending therefrom and around a periphery thereof, shown outer rib 1504 and inner rib 1506, and a gap, shown as rib gap 1508, positioned therebetween. The outer rib 1504 is received by the outer channel 1114 of the upper flange 1110 of the body 1100, the inner rib 1506 is received by the inner channel 1116 of the upper flange 1110 of the body 1100, and the base rib 1112 of the upper flange 1110 of the base 1100 is received by the rib gap 1508 of the top ring 1500, thereby securing the upper retainer 1208 at the upper end 1204 of the outer cover 1200 within the outer channel 1114 and the upper retainer 1308 at the upper end 1304 of the container retainer 1300 within the inner channel 1116. The outer rib 1504, the inner rib 1506, the upper retainer 1208, the upper retainer 1308, and the base rib 1112 may press fit together to secure the base 1100, the outer cover 1200, the container retainer 1300, and the top ring 1500 together.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

It is important to note that the construction and arrangement of the beverage holder 10 and the components thereof as shown in the various exemplary embodiments is illustrative only. Additionally, any element disclosed in one embodiment may be incorporated or utilized with any other embodiment disclosed herein.

The invention claimed is:
1. A beverage holder comprising:
a frame including:
   a sidewall having an upper end and a lower end, the upper end defining a plurality of protrusions; and
   a bottom wall extending across the lower end of the sidewall, wherein the sidewall and the bottom wall cooperatively define a chamber;
an insert coupled to the upper end of the sidewall, the insert including:
   a peripheral rim defining a plurality of apertures that receive the plurality of protrusions; and
   a flexible collar extending from the peripheral rim and at least partially into the chamber, the flexible collar defining an opening leading to the chamber; and
a cover including a plurality of interfaces that engage with the plurality of protrusions to couple the cover to the upper end of the sidewall and to secure the insert between the frame and the cover, the cover defining an aperture that aligns with the chamber of the frame and the opening of the insert.

2. The beverage holder of claim 1, wherein the plurality of protrusions are a first plurality of protrusions and the plurality of interfaces are a first plurality of interfaces, wherein the lower end of the sidewall defines a second plurality of protrusions, further comprising a base including a second plurality of interfaces that engage with the second plurality of protrusions to couple the base to the lower end of the sidewall.

3. The beverage holder of claim 2, further comprising a body disposed around the frame and positioned between the cover and the base, the body having an interior surface that defines a passage that receives the sidewall of the frame.

4. The beverage holder of claim 3, wherein the interior surface defines a plurality of core interfaces, wherein the frame includes a plurality of tabs extending outward from the sidewall, and wherein the plurality of tabs are positioned to engage with the plurality of core interfaces.

5. The beverage holder of claim 3, wherein the frame includes a pair of flanges extending outward from the sidewall, wherein the pair of flanges define flange apertures, wherein the body defines a gap within which the pair of flanges are received, and wherein the body includes a pair of retainers that extend into the gap and engage with the flange apertures.

6. The beverage holder of claim 5, further comprising a cap disposed along the pair of flanges and closing the gap.

7. The beverage holder of claim 6, wherein the cap includes an upper interface and a lower interface, wherein the base includes a lower protrusion that engages with the lower interface of the cap, and wherein the cover includes an upper protrusion that engages with the upper interface of the cap.

8. The beverage holder of claim 7, wherein the upper interface and the upper protrusion are different than the lower interface and the lower protrusion, respectively.

9. The beverage holder of claim 3, further comprising an outer cover removably coupled around an exterior surface of the body.

10. The beverage holder of claim 9, wherein the exterior surface of the body has a curved profile.

11. The beverage holder of claim 10, wherein the outer cover has graphics thereon, and wherein the outer cover is configured such that the graphics are not distorted when applied around the curved profile.

12. The beverage holder of claim 9, wherein the outer cover defines a plurality of upper apertures that interface with the first plurality of protrusions to couple the outer cover to the upper end of the sidewall of the frame and a plurality of lower apertures that interface with the second plurality of protrusions to couple the outer cover to the lower end of the sidewall of the frame.

13. The beverage holder of claim 12, wherein the interior surface of the body is shaped such that a gap is present between the interior surface and the sidewall prior to the outer cover being installed, and wherein the outer cover is configured to compress the body against the frame to close the gap.

14. The beverage holder of claim 9, wherein the outer cover is a first outer cover, and wherein the beverage holder further comprises a second, different outer cover that is selectively swappable with the first outer cover.

15. The beverage holder of claim 2, further comprising a counterweight positioned between the bottom wall of the frame and the base.

16. The beverage holder of claim 1, wherein the flexible collar includes a plurality of ribs with a plurality of recesses positioned therebetween, further comprising a plurality of slide pads coupled to the plurality of ribs.

17. The beverage holder of claim 16, wherein each of the plurality of slide pads includes:
 a housing positioned along an underside of a respective one of the plurality of ribs;
 a flap positioned along an upper side of the respective one of the plurality of ribs, the flap including a retainer extending therefrom that extends through the respective one of the plurality of ribs into the housing; and
 a flexible edge connecting the flap to the housing.

18. The beverage holder of claim 16, further comprising a biasing element extending between the plurality of slide pads.

19. A beverage holder comprising:
 a frame defining a chamber;
 an insert coupled to an upper end of the frame, the insert extending at least partially into the chamber, the insert defining an opening through which the chamber is accessible;
 a top cover coupled to the upper end of the frame, securing the insert between the frame and the top cover;
 a base coupled to a lower end of the frame;
 a body disposed around the frame and positioned between the top cover and the base; and
 an outer cover having a first end coupled to the upper end of the frame and a second end coupled to the lower end of the frame, the first end positioned between the frame and the top cover, the second end positioned between the frame and the base.

20. A beverage holder comprising:
 a frame defining a chamber;
 an insert coupled to an upper end of the frame, the insert extending at least partially into the chamber, the insert defining an opening through which the chamber is accessible;
 a top cover coupled to the upper end of the frame, securing the insert between the frame and the top cover;
 a base coupled to a lower end of the frame; and
 a body disposed around the frame and positioned between the top cover and the base.

* * * * *